United States Patent
Kim et al.

(10) Patent No.: US 11,064,158 B2
(45) Date of Patent: *Jul. 13, 2021

(54) HOME MONITORING METHOD AND APPARATUS

(71) Applicant: Samsung Electronics Co., Ltd., Suwon-si (KR)

(72) Inventors: Kyung-Jae Kim, Suwon-si (KR); Ji-Hyeon Kweon, Yongin-si (KR); Keun-Cheol Lee, Seoul (KR); Dong-Seok Kim, Seoul (KR); Hyun-Sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,270

(22) Filed: Jan. 21, 2020

(65) Prior Publication Data

US 2020/0162700 A1 May 21, 2020

Related U.S. Application Data

(63) Continuation of application No. 16/262,174, filed on Jan. 30, 2019, now Pat. No. 10,819,958, which is a (Continued)

(30) Foreign Application Priority Data

Dec. 14, 2012 (KR) .................... 10-2012-0146251
Sep. 5, 2013 (KR) .................... 10-2013-0106518

(51) Int. Cl.
*H04N 7/18* (2006.01)
*H04N 21/414* (2011.01)
(Continued)

(52) U.S. Cl.
CPC ....... *H04N 7/181* (2013.01); *G08B 13/19684* (2013.01); *H04L 12/2818* (2013.01);
(Continued)

(58) Field of Classification Search
CPC H04N 7/18; H04N 21/00; H04N 5/00; H04N 7/00; H04L 12/00; G08B 13/00
See application file for complete search history.

(56) References Cited

U.S. PATENT DOCUMENTS 8,520,072 B1 8/2013 Slavin et al.
2003/0229474 A1* 12/2003 Suzuki ............. G08B 13/19623
702/188
(Continued)

FOREIGN PATENT DOCUMENTS

CN 1518294 A 8/2004
CN 1661977 A 8/2005
(Continued)

OTHER PUBLICATIONS

Korean Office Action dated Feb. 18, 2020, issued in Korean Patent Application No. 10-2019-0169461.
(Continued)

*Primary Examiner* — Maryam A Nasri
(74) *Attorney, Agent, or Firm* — Jefferson IP Law, LLP

(57) ABSTRACT

Provided is a home monitoring method and apparatus. A home gateway executes receiving, from a mobile terminal, a request message for requesting home monitoring, providing, to the mobile terminal in response to the request message, monitoring information associated with a camera module included in at least one home device registered in advance and/or a position to be monitored, receiving, from the mobile terminal, selection information indicating a first camera module selected based on the monitoring information, transmitting, to the mobile terminal, image data cap-
(Continued)

tured and collected by the first camera module in response to the reception of the selection information, receiving, from the mobile terminal, a control command with respect to the first camera module, and transmitting the control command to a first home device including the first camera module.

12 Claims, 19 Drawing Sheets

Related U.S. Application Data continuation of application No. 14/105,690, filed on Dec. 13, 2013, now abandoned.

(51) Int. Cl.
  *H04N 21/422* (2011.01)
  *H04N 21/436* (2011.01)
  *H04L 12/28* (2006.01)
  *G08B 13/196* (2006.01)
  *H04N 5/00* (2011.01)

(52) U.S. Cl.
  CPC ...... *H04L 12/2825* (2013.01); *H04L 12/2836* (2013.01); *H04N 5/00* (2013.01); *H04N 21/41407* (2013.01); *H04N 21/42202* (2013.01); *H04N 21/436* (2013.01)

(56) References Cited

U.S. PATENT DOCUMENTS

| | | |
|---|---|---|
| 2004/0145468 A1 | 7/2004 | La et al. |
| 2005/0091684 A1 | 4/2005 | Kawabata et al. |
| 2005/0184865 A1 | 8/2005 | Han |
| 2006/0061657 A1 | 3/2006 | Rew et al. |
| 2006/0069463 A1* | 3/2006 | Kim .................. G08B 13/1966 700/245 |
| 2006/0140481 A1* | 6/2006 | Kim ...................... G06T 7/246 382/190 |
| 2006/0155851 A1 | 7/2006 | Ma et al. |
| 2006/0178777 A1 | 8/2006 | Park et al. |
| 2007/0021871 A1 | 1/2007 | Wang et al. |
| 2008/0065267 A1 | 3/2008 | Hong et al. |
| 2011/0106279 A1 | 5/2011 | Cho et al. |
| 2012/0028589 A1 | 2/2012 | Fan et al. |
| 2012/0130513 A1 | 5/2012 | Hao et al. |
| 2012/0151058 A1 | 6/2012 | Lee |
| 2012/0185094 A1 | 7/2012 | Rosenstein et al. |
| 2012/0185095 A1* | 7/2012 | Rosenstein .......... G05D 1/0227 700/259 |
| 2012/0197439 A1 | 8/2012 | Wang et al. |
| 2012/0210205 A1 | 8/2012 | Sherwood et al. |
| 2013/0120131 A1 | 5/2013 | Hicks, III |

FOREIGN PATENT DOCUMENTS

| | | |
|---|---|---|
| CN | 1753491 A | 3/2006 |
| CN | 201123784 Y | 10/2008 |
| CN | 201327585 Y | 10/2009 |
| CN | 101571715 A | 11/2009 |
| CN | 102253673 A | 11/2011 |
| CN | 102668592 A | 9/2012 |
| KR | 10-2002-0081035 A | 10/2002 |
| KR | 10-2006-0022843 A | 3/2006 |
| KR | 10-2006-0090008 A | 8/2006 |
| KR | 10-0677252 B1 | 2/2007 |
| KR | 10-2009-0052246 A | 5/2009 |
| KR | 10-2012-0114877 A | 10/2012 |

OTHER PUBLICATIONS

Intelligent aids and their applications, edited by Zhang Xiaoyu, Mar. 31, 2012, p. 288.
Chinese Official Action dated May 28, 2020, issued in Chinese Patent Application No. 201910316984.7.
Chinese Official Action dated Jan. 5, 2021, issued in Chinese Patent Application No. 202010101366.3.

* cited by examiner

HOME MONITORING METHOD AND APPARATUS

CROSS-REFERENCE TO RELATED APPLICATION(S)

This application is a continuation application of prior application Ser. No. 16/262,174, filed on Jan. 30, 2019, which is a continuation application of prior application Ser. No. 14/105,690, filed on Dec. 13, 2013, which was based on and claimed priority under 35 U.S.C § 119(a) of a Korean patent application number 10-2012-0146251, filed on Dec. 14, 2012, in the Korean Intellectual Property Office, and of a Korean patent application number 10-2013-0106518, filed on Sep. 5, 2013, in the Korean Intellectual Property Office, the disclosure of each of which is incorporated by reference herein in its entirety.

BACKGROUND OF THE INVENTION

1. Field of the Invention

The present disclosure relates to a home network system, and particularly, to a home monitoring method and apparatus using electrical appliances and cameras.

2. Description of the Related Art

A home network system refers to a system that connects home devices installed in a house through a wired or wireless network so as to control the home devices. An advanced home network system integrates home devices through a Home Gateway (HGW or H-GW) and connects the home devices to an external common data network, for example, an Internet Protocol (IP) network (that is, the Internet), so as to provide more various Internet-based services. The home network system may control home devices based on a request from a user and may provide a service desired by the user.

Recently, types of home devices have gradually diversified, and accordingly, user's requests have diversified and thus, there is a need to provide the best service by taking into consideration various requests from a user.

SUMMARY OF THE INVENTION

Problems to be Solved by the Invention

Accordingly, an aspect of the present disclosure is to provide a method and apparatus for providing a service for a home network system.

Another aspect of the present disclosure is to provide a home monitoring method and apparatus through a home network system.

Another aspect of the present disclosure is to provide a method and apparatus for monitoring circumstances in a house through an electrical appliance and an IP camera in a home network system.

Means for Solving Poblems

In accordance with another aspect of the present disclosure, there is provided a home monitoring method by a home gateway included in a home network system, the method including: receiving, from a mobile terminal, a request message for requesting home monitoring; providing, to the mobile terminal in response to the request message, monitoring information associated with a camera module included in at least one home device registered in advance and/or a position to be monitored; receiving, from the mobile terminal, selection information indicating a first camera module selected based on the monitoring information; transmitting, to the mobile terminal, image data captured and collected by the first camera module in response to the reception of the selection information; receiving, from the mobile terminal, a control command with respect to the first camera module; and transmitting the control command to a first home device including the first camera module.

In accordance with another aspect of the present disclosure, there is provided a home monitoring method by a mobile terminal that is registered in a home gateway included in a home network system, the method including: transmitting a request message for requesting home monitoring to the home gateway; receiving, from the home gateway, monitoring information associated with a camera module included in at least one home device registered in advance and/or a position to be monitored, in response to the transmission of the request message; transmitting, to the home gateway, selection information indicating a first camera module selected based on the monitoring information; receiving, from the home gateway, image data captured and collected by the first camera module, in response to the transmission of the selection information; and transmitting, to the home gateway, a control command input by a user with respect to the first camera module.

In accordance with another aspect of the present disclosure, there is provided a home gateway apparatus that supports home monitoring in a home network system, the apparatus including: a network interface module that receives a request message for requesting home monitoring from a mobile terminal through wireless and wired networks, provides, to the mobile terminal, monitoring information associated with a camera module included in at least one home device registered in advance and/or a position to be monitored, in response to the request message, receives, from the mobile terminal, selection information indicating a first camera module selected based on the monitoring information, transmits, to the mobile terminal, image data captured and collected from the first camera module in response to the reception of the selection information, and receives a control command with respect to the first camera module from the mobile terminal; and at least one communication module that is configured to enable communication with a camera module included in at least one home device registered in the home network system, and that transmits the control command to a first home device equipped with the first camera module.

In accordance with another aspect of the present disclosure, there is provided a mobile terminal apparatus that executes home monitoring through a home gateway included in a home network system, the mobile terminal apparatus including: a mobile communication module that transmits a request message for requesting home monitoring to the home gateway through wireless and wired networks, receives, from the home gateway, monitoring information associated with a camera module included in at least one home device registered in advance and/or a position to be monitored, in response to the transmission of the request message, transmits, to the home gateway, selection information indicating a first camera module selected based on the monitoring information, receives, from the home gateway, image data captured and collected by the first camera module, in response to the transmission of the selection information, and transmits, to the home gateway, a control command input by a user with respect to the first camera module; and a display module that displays the image data.

DETAILED DESCRIPTION OF THE EXEMPLARY EMBODIMENTS

Hereinafter, various embodiments of the present disclosure will be described in detail with reference to the accompanying drawings. Further, in the following description of the present disclosure, a detailed description of known functions and configurations incorporated herein will be omitted when it may make the subject matter of the present disclosure rather unclear. Then, terms described later are defined in consideration of the functions of the present disclosure, but may vary according to the intention or convention of a user or operator. Therefore, the definition needs to be determined based on the overall contents of the present specifications.

Figure 1:
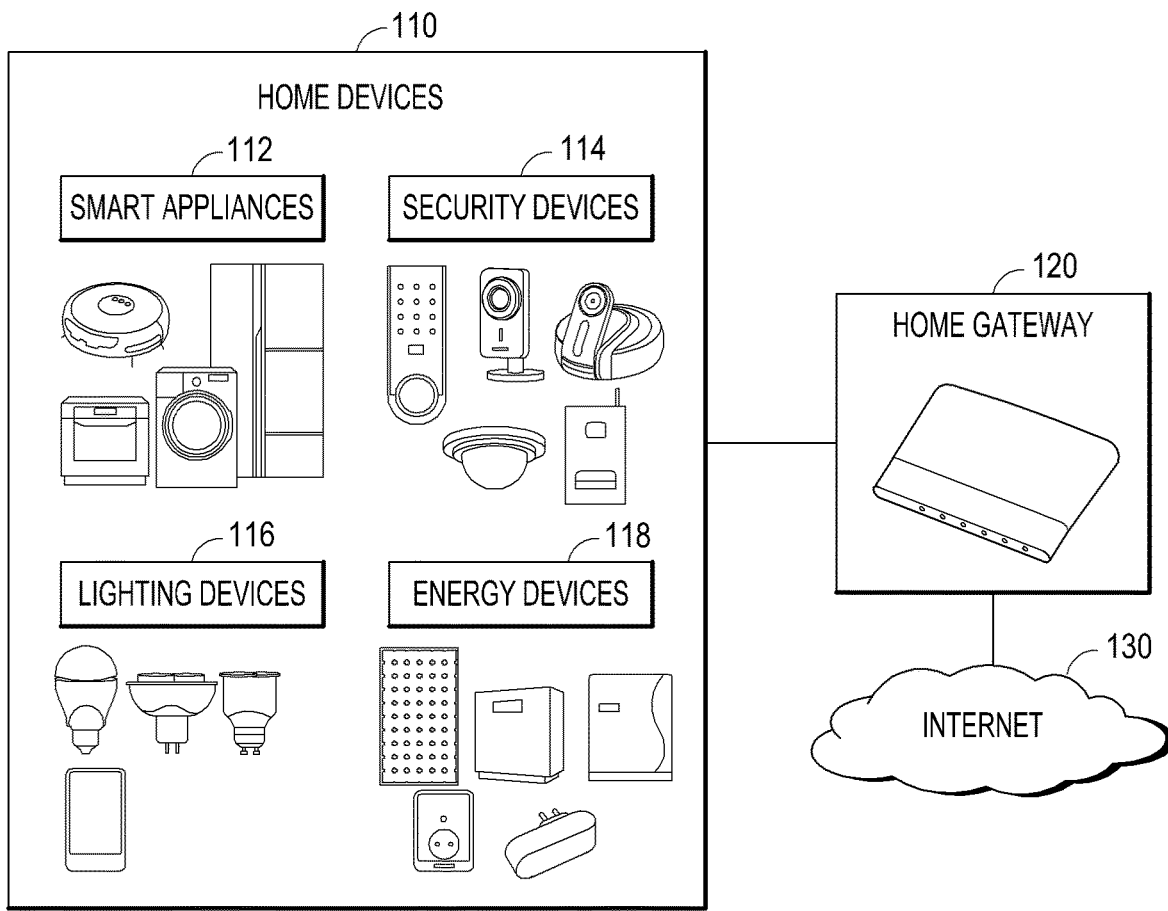
FIG. 1 illustrates a simplified structure of a home network system according to an embodiment of the present disclosure.

FIG. 1 illustrates a simplified structure of a home network system according to an embodiment of the present disclosure.

Referring to FIG. 1, a home network system is configured to include home devices 110 having a control and communication function and a Home GateWay (HGW) 120. The home devices 110 are located inside (or outside) a house, and include smart appliances 112, security devices 114, lighting devices 116, energy devices 118, and the like. For example, the smart appliances 112 correspond to a Television (TV), an air-conditioner, a refrigerator, a washing machine, a robot-cleaner, a humidifier, and the like. The security devices 114 correspond to a door-lock, a security camera, a Closed Circuit Television (CCTV), and a security sensor that senses a contact, a sound, a movement, and the like, the lighting devices 116 correspond to a Light Emitting Diode (LED), a lamp, and the like, and the energy devices 118 may correspond to a heater, a power meter, a power socket, an electrical outlet, a multiple-tap, and the like. In addition, the home devices 110 may include a Personal Computer (PC), an IP camera, an Internet phone, a wired/wireless phone, a mobile phone used in a home, a curtain or blind that may be electrically controlled, and the like.

The home devices 110 may be capable of performing communication with the home gateway 110 according to a wired or wireless communication scheme, and may be configured to receive a control command from the home gateway 120, to operate based on the control command, and to transmit requested information and/or data to the home gateway 120.

The home gateway 120 may be embodied as an independent apparatus, or an apparatus equipped with a home gateway function. For example, the home gateway 120 may be embodied as a television, a cellular phone, a tablet computer, a set-top box, a robot cleaner, or a personal computer. The home gateway 120 may be equipped with corresponding communication modules for performing communication with the home devices 110 based on a wired or wireless communication scheme, so as to register and store information associated with the home devices 110, to manage and control operations, supportable functions, and states of the home devices 110, and to collect and store required information from the home devices 110. Particularly, the home gateway 120 may be connected with a data network such as the Internet, that is, an IP network 130, and allows a connection by a communication terminal through the Internet 130 and transfers a control signal received from the communication terminal to a corresponding home device. Also, the home gateway 120 may communicate with the communication terminal using a wireless communication scheme such as WiFi (Wireless Fidelity), Zigbee, Bluetooth, an NFC (Near Field Communication), and z-wave.

The home network system configured as described above may provide a home entertainment service, such as an Internet TV (IPTV) through the Internet 130, a Video on Demand (VoD) and the like, a home data communication service such as data sharing, Voice over IP (VoIP), a video phone, and the like, and a home automation service such as remote control of an electrical appliance, a remote meter reading, crime prevention, disaster prevention and the like. That is, the home network system may connect all types of home devices used inside and outside a house through a single network for a control.

Meanwhile, a user may connect with a home gateway included in the home network system from the outside of the house using a communication terminal such as a mobile terminal, or may remotely connect with each home device through the home gateway. The mobile terminal may be, for example, a Personal Digital Assistant (PDA) including a communication function, a Smart Phone, a feature phone, a tablet Personal Computer (PC), a notebook and the like, and may access a home network system directly or through a provider's network and the Internet.

Figure 2:
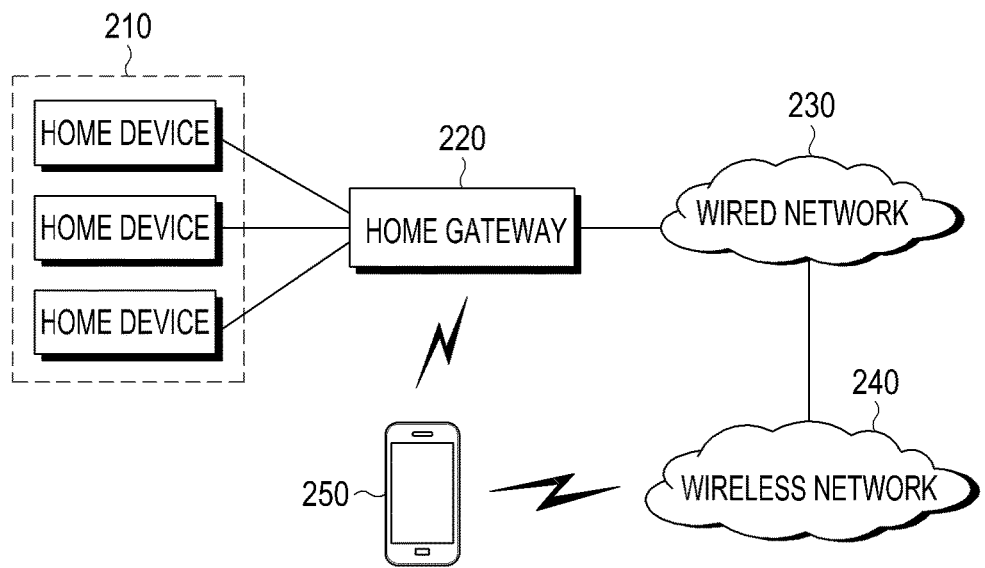
FIG. 2 illustrates a simplified configuration of a home network system that is capable of connecting with a mobile terminal according to an embodiment of the present disclosure.

FIG. 2 illustrates a simplified configuration of a home network system that is capable of connecting with a mobile terminal according to an embodiment of the present disclosure.

Referring to FIG. 2, the home devices 110 in the home network system connects with the home gateway 120 through a wired or wireless communication scheme. The home gateway 120 may connect with a wired network 230 such as the Internet. A registered mobile terminal 250 may connect with a wireless network 240 including a wireless access network and a provider core network, and may access the home gateway 220 through the wired network 230. A wireless network 240 may be a 2G(Generation) or 3G cellular communication system, 3GPP(3rd Generation Partnership Project), a 4G communication system, LTE (Long-Term Evolution), WiMAX (World Interoperability for Microwave Access), and the like. Also, the mobile terminal 250 may directly communicate with the home gateway 220 using a wireless communication scheme such as WiFi, Zigbee, Bluetooth, an NFC, and z-wave.

Figure 3:
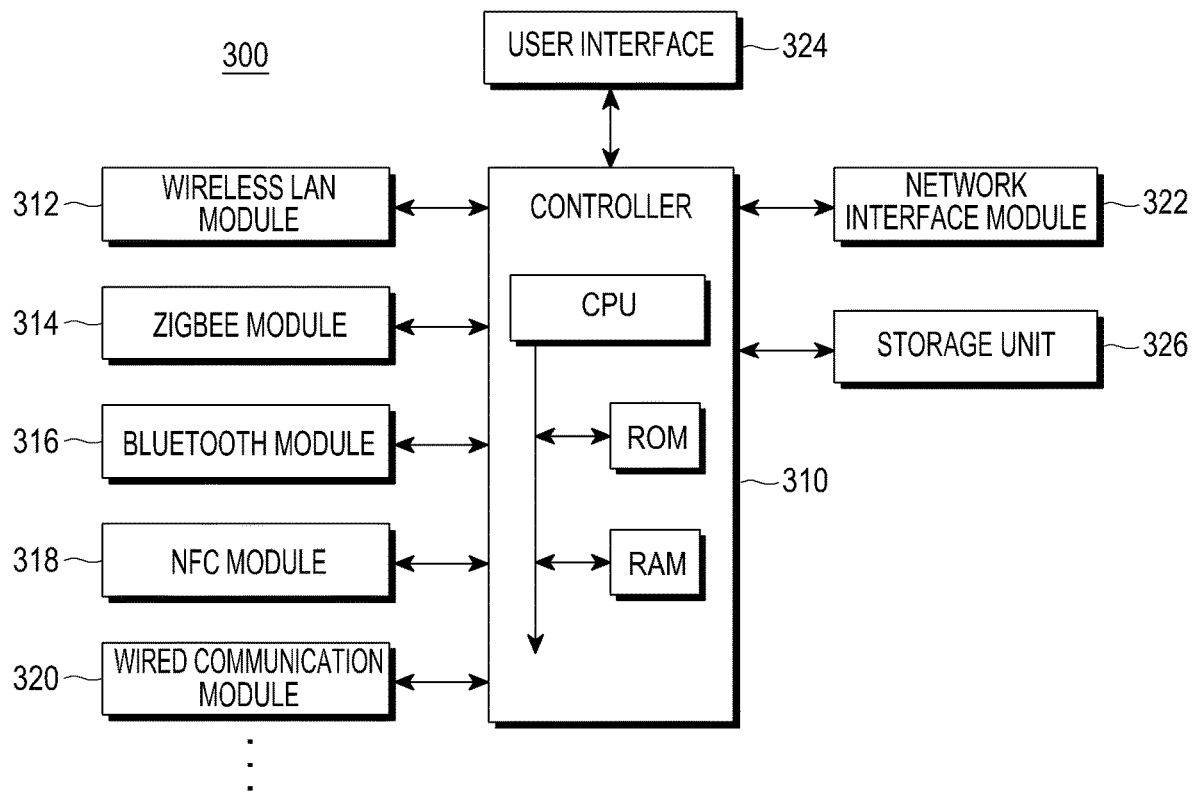
FIG. 3 is a block diagram illustrating a schematic configuration of a home gateway according to an embodiment of the present disclosure.

FIG. 3 is a block diagram illustrating a schematic configuration of a home gateway according to an embodiment of the present disclosure. A home gateway may be configured to include at least one of the illustrated component elements.

Referring to FIG. 3, a home gateway 300 may be connected with home devices (not illustrated) using at least one communication module 312 through 314. The communication modules 312 through 314 include at least one of a wireless LAN module 312 such as WiFi, a Zigbee module 314, a Bluetooth module 316, an NFC module 318, and a wired communication module 320. Also, the home gateway 300 includes a controller 310, a network interface module 322, a User Interface (UI) 324, and a storage unit 326.

The controller 310 includes a CPU (Central Processing Unit), a Read-Only Memory (ROM) storing a control program for controlling the home gateway 300, and a Random Access Memory (RAM) used as a storage area for works performed in the home gateway 300. The controller 310 may communicate with home devices through the communication modules 312 through 320 by executing programs stored in the ROM or RAM or application programs that may be stored in the storage unit 326, and may generate and transmit a control command to the home devices or may store information collected from the home devices in the storage unit 326.

The user interface 324 includes an output module such as a display, a speaker, and a notification lamp, and an input module such as a touch screen, a keypad, and a microphone, and may be used when a user directly controls the home gateway 300, registers or deletes home devices in/from the home gateway 300, or controls home devices through the home gateway 300.

The network interface 322 may be, for example, an Internet communication module, and may connect the home gateway 300 to an external network.

The storage unit 326 is configured to store a program code, data, or information required for an operation of the home gateway 300, under a control of the controller 310, and may store a high capacity data transferred from external devices or home devices when needed. Also, the storage unit 326 may further store at least one of additional information required for controlling a home network system, for example, an arrangement plan (or a map) including an arrangement of sections included in a house (such as, a room, a kitchen, a living room, a bathroom, and the like), information associated with home devices included in a home network system, information associated with at least one target position to be secured and monitored, and movement commands for controlling a movement of a mobile home device.

Figure 4:
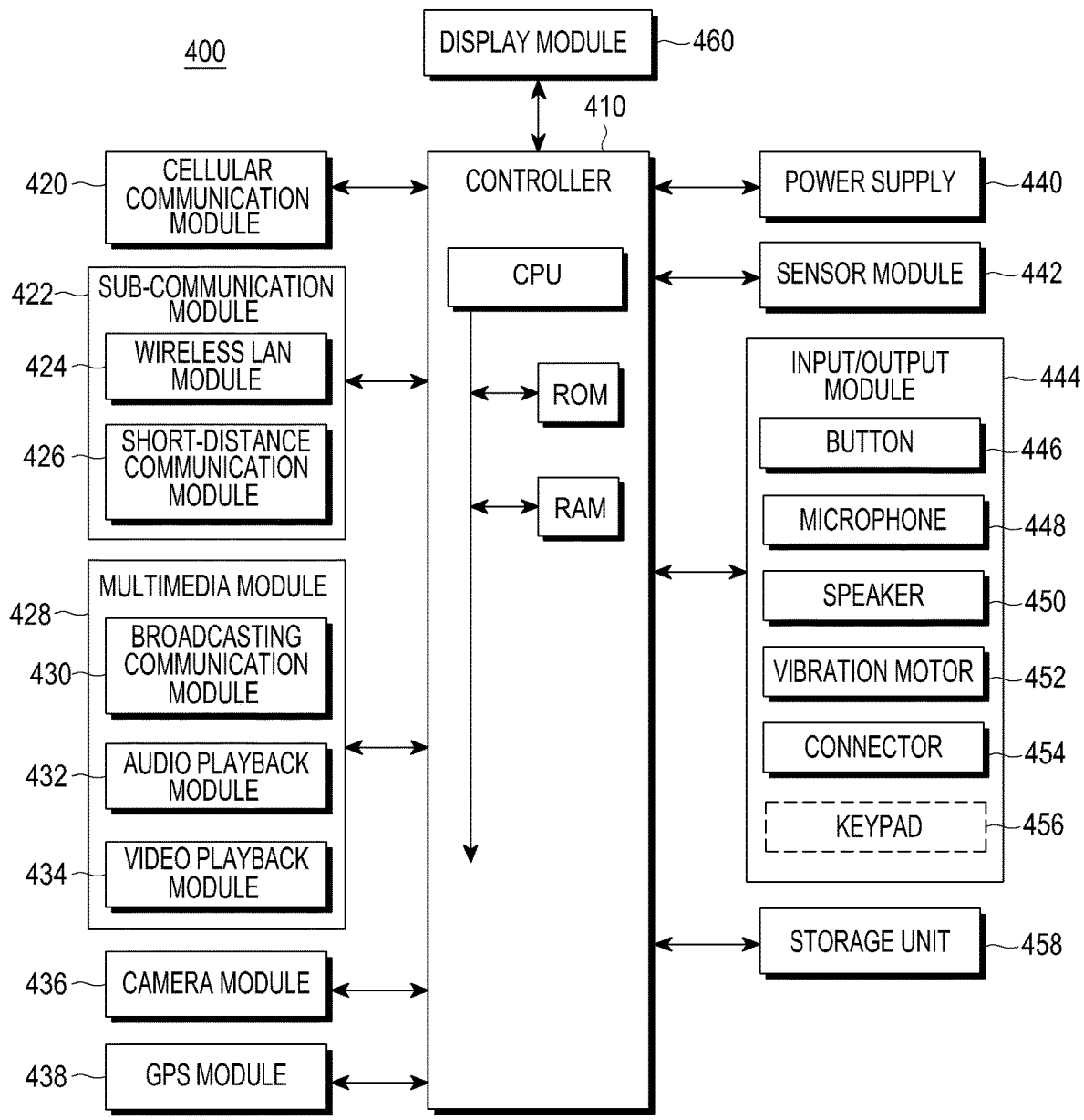
FIG. 4 is a block diagram illustrating a schematic configuration of a mobile terminal according to an embodiment of the present disclosure.

FIG. 4 is a block diagram illustrating a schematic configuration of a mobile terminal according to an embodiment of the present disclosure. A mobile terminal may be configured to include at least one of the illustrated component elements.

Referring to FIG. 4, a mobile terminal 400 is configured to include a controller 410, a cellular mobile communication module 420, a sub-communication module 422, a multimedia module 428, a camera module 436, a GPS (Global Positioning System) module 438, an input/output module 444, a sensor module 442, a storage unit 458, a power supplier 440, and at least one display module 460. The sub-communication module 130 includes at least one of a wireless LAN module 424 and a short-distance communication module 426, and the multimedia module 428 includes at least one of a broadcasting communication module 430, an audio playback module 432, and a video playback module 434. The camera module 436 includes at least one camera, and the input/output module 444 includes at least one of a button set 446, a microphone 448, a speaker 450, a vibration motor 452, a connector 454, and a keypad 456.

The controller 410 includes a CPU, a ROM storing a control program for controlling the mobile terminal 400, and a RAM used as a storage area for storing a signal or data input from the outside of the mobile terminal 400 or for storing works performed in the mobile terminal 400, and may control other component elements of the mobile terminal 400.

The cellular mobile communication module 420 connects the mobile terminal 400 to an external apparatus (particularly, a base station of a cellular system) through at least one or a plurality of antennas (not illustrated), using a wireless access technology based on a cellular communication protocol according to a control of the controller 410. The cellular mobile communication module 420 transmits/receives a wireless signal including a voice call, a video call, a Short Messaging Service (SMS) message, or a Multimedia Messaging Service (MMS) message to/from another apparatus that is capable of performing communication.

The wireless LAN module 424 may connect with the Internet according to a control of the controller 410 in a place where a wireless AP (access point) (not illustrated) is installed. The short-distance communication module 426 may execute a wireless short-distance communication between the mobile terminal 400 and an external apparatus according to a control of the controller 410. A short-distance communication scheme may include Bluetooth, Zigbee, IrDA (infrared data association) and the like.

The display 460 displays information associated with various applications (for example, calling, data transmission, broadcasting, a camera, and the like) that may be executed by the controller 410, and may be configured as a touch screen that provides a user interface that is configured to be adjusted to the same. The controller 410 may enable a soft key displayed on the touch screen 460 to be selected or may execute an application or a function corresponding to the soft key, in response to a user gesture sensed on the touch screen. The user gesture includes a touch by a finger or an instrument, motion recognition by a body part, and the like.

A user located in the outside may desire a home network system configured as described above to execute a monitoring function with respect to the circumstances in a house. In this case, the user may connect with a home gateway using a mobile terminal or a computing apparatus, and may monitor the circumstances in the house by controlling at least one of the registered home devices through the home gateway.

Figure 5:
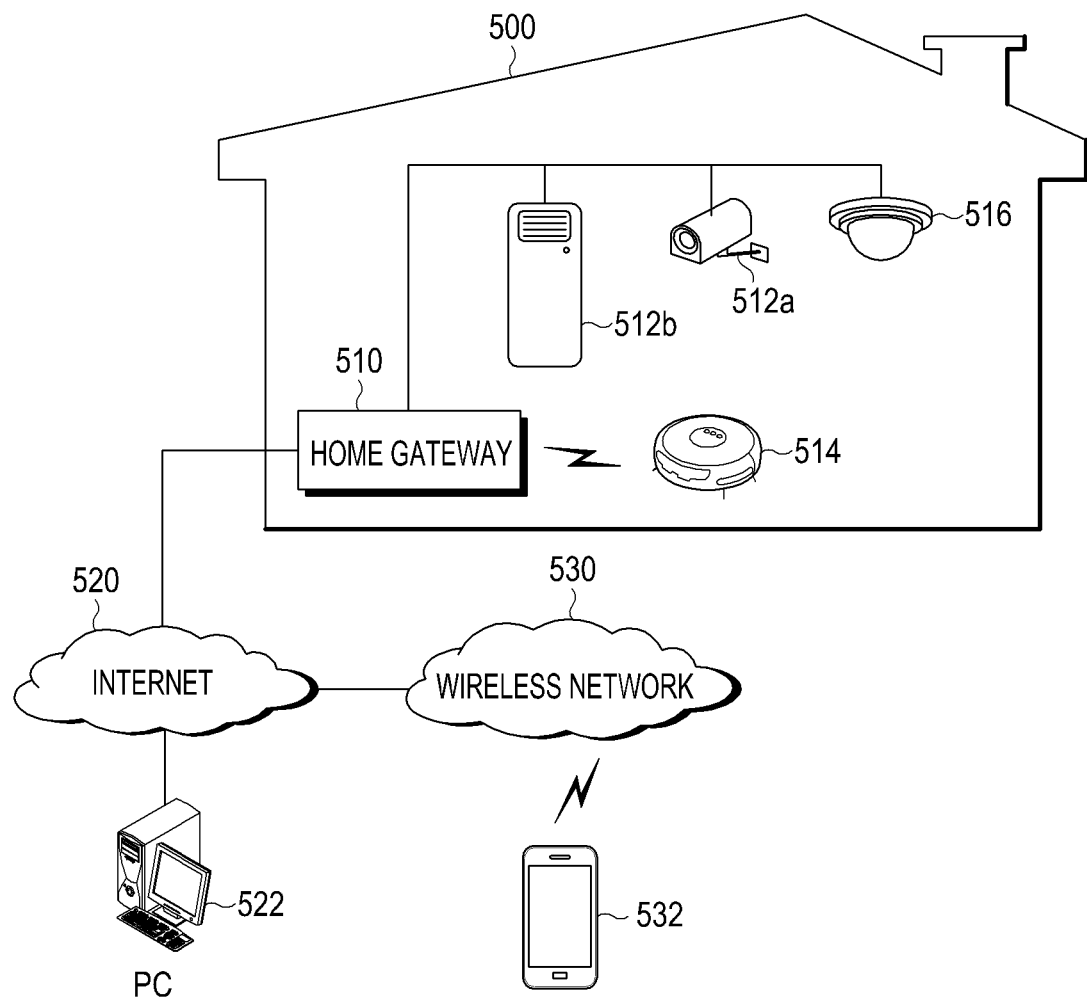
FIG. 5 illustrates a schematic configuration of a home network system that supports home monitoring according to an embodiment of the present disclosure.

FIG. 5 illustrates a schematic configuration of a home network system that supports home monitoring according to an embodiment of the present disclosure.

Referring to FIG. 5, a home network system 500 includes a home gateway 510, at least one stationary home device 512a and 512b (commonly called 512) equipped with a camera module (or a stationary camera), and at least one mobile home device equipped with a camera module (or a mobile camera) 514. The stationary home device 512 may be a Closed Circuit Television (CCTV) installed in a predetermined location such as a wall or a ceiling, an electrical appliance equipped with a camera module such as an air-conditioner or refrigerator, and the like, and may be connected with the home gateway 510 through a wired interface or may be connected with the home gateway 510 through a wireless interface.

The mobile home device 514 may be a robot cleaner, a mobile toy, or the like that includes a movement function, and may be connected with the home gateway 510 through a wireless interface and moves based on a control of the home gateway 510. At least one of the home devices 512 and 514 includes a function of sensing a movement through a camera or a sensor, and may report a movement sensing result to the home gateway 510. Also, at least one of the home devices 512 and 514 may be equipped with a light such as an LED so as to capture an image in a dark room.

In addition, one or more sensing modules 516 that are installed in a position that requires monitoring may be connected with the home gateway 510 through a wired or wireless interface. The sensing module 516 may be a door sensor that senses intrusion through a front door, a magnetic sensor that senses breaking into a window, a ultrasonic sensor, a gas sensor that senses a leakage of gas from a gas range or the like, a heat sensor that senses a fire, a movement sensor that senses a movement of an intruder or a pet, a microphone that senses an abnormal sound, and the like, and may include a signal transmitting module that monitors occurrence of various abnormal circumstances, and wiredly or wirelessly transmits an abnormal signal including corresponding identification information when a corresponding abnormal circumstance is sensed. For example, the sensing module 516 may be installed in a fixed position that requires monitoring or may be included in a mobile home device. The abnormal signal may be collected by the home gateway 510 or may be directly transferred to the home devices 512 and 514 equipped with a camera.

The home gateway 510 registers information associated with the home devices 512 and 514, and manages states. When providing the stationary home device 512, the home gateway 510 may register and manage a position where the home device 512 is installed, for example, a first CCTV in a main room, and second and third CCTVs in a living room. When providing the mobile home device 514, the home gateway 510 registers and manages a docking position of the home device 514 (for example, a charger of a robot cleaner), and additionally senses and traces a current position of the home device 514 using an RF (Radio Frequency) tag, a sensor, a camera included in the home device 514, and the like.

Also, the home gateway 510 may transmit, to the home device 514, a movement command for controlling a movement, and may store a history of the movement command together with time information. For example, the home gateway 510 stores movement commands that instruct the home device 514 to move from a docking position to at least one position to be monitored, and to return to the docking position again. The at least one position to be monitored may be, for example, a place where a stationary sensing module is not installed, a place that is vulnerable to security, or a place where a child or a pet exists, and may be set by a user. As another example, the home gateway 510 may set the home device 514 to patrol a path between a docking position and a position (or positions) to be monitored when the home network system is operated in a security mode.

The home gateway 510 may collect image data captured through cameras included in the home devices 512 and 514. Collecting the image data may be continuously executed in real time or may be begun based on a predetermined event condition. The image data may be stored in the home gateway 510 or an external storage apparatus during a predetermined period of time or until it is deleted by a user.

A user may connect with the home gateway 510 through the Internet 520 using a personal computer 522 in an office, and may check image data collected by the home gateway 510. Also, the user may connect with the home gateway 510 through a wireless network 530 and the Internet 520 using a mobile terminal 532 in a mobile environment, and may determine image data collected by the home gateway 510.

When directions of cameras included in the stationary home devices 512 are adjustable, a user transmits a control command to the home gateway 510 through the personal computer 522 or the mobile terminal 532, and the home gateway 510 transfers the control command to a corresponding home device 512. The control command may include at least one of an upper/lower/left/right side adjusting command for adjusting directions of stationary cameras and a zooming-in/out (Zoom In/Out) command. Then, the home device 512 controls a camera lens in response to the control command, and transfers image data captured through the controlled camera lens to the home gateway 510.

Also, the user transmits, to the home gateway 510, a control command for controlling a movement of a mobile camera (or a mobile home device 514 equipped with a camera module) 514 through the personal computer 522 or the mobile terminal 532, and the home gateway 510 transfers the control command to a corresponding home device 514. The control command includes a left/right rotation command, a forward/backward movement command, and/or a zooming in/out command for a movement of the home device 514. Then, the home device 514 controls or moves a camera lens in response to the control command, and transfers image data captured through the controlled camera lens to the home gateway 510.

Figure 6:
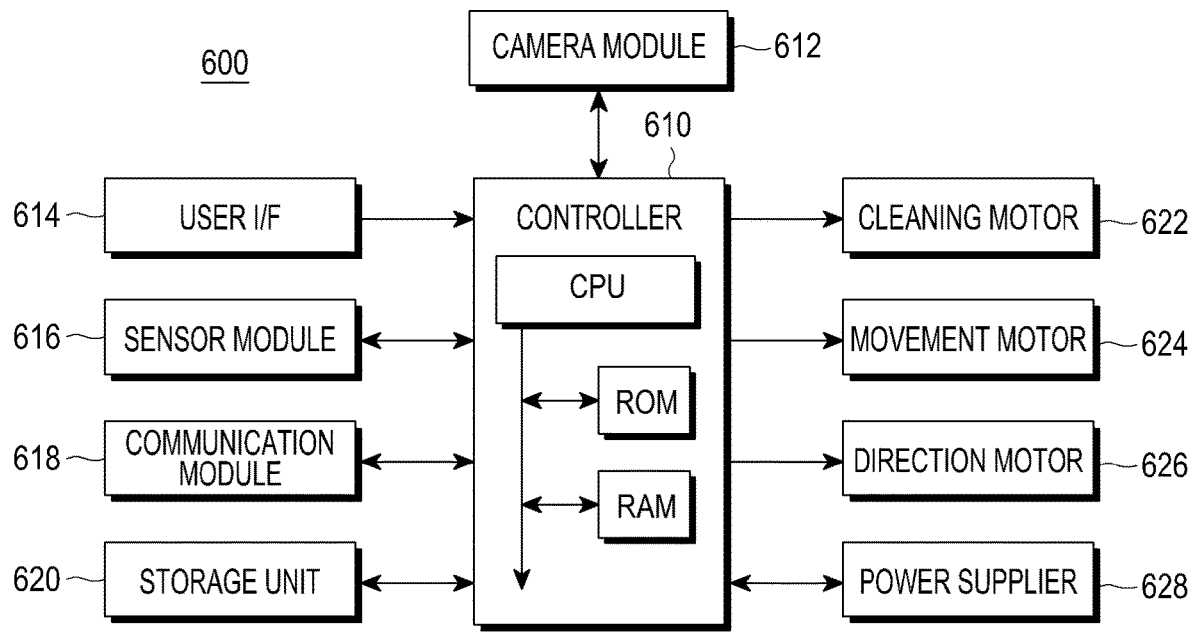
FIG. 6 illustrates a configuration of a mobile home device that is equipped with a camera according to an embodiment of the present disclosure.

FIG. 6 illustrates a configuration of a mobile home device that is equipped with a camera according to an embodiment of the present disclosure. Here, a configuration of a home device embodied as a robot cleaner is illustrated. The robot cleaner may be configured to include at least one of the illustrated component elements.

Referring to FIG. 6, a robot cleaner 600 is configured to include a controller 610, a camera module 612, a user interface 614, a sensor module 616, a communication module 618, a storage unit 620, a cleaning motor 622, a movement motor 624, a direction motor 626, and a power supplier 628.

The controller 610 includes a CPU, a ROM storing a control program for controlling a cleaning function and a movement of the robot cleaner 600, and a RAM used as a storage area for storing a signal or data input from the outside of the robot cleaner 600 or for storing works performed in the robot cleaner 600, may control a function of the robot cleaner 600 based on a stored control program or a control command received from the outside, and may control the communication module 618 to transmit image data collected by the camera module 612 to a designated destination.

The camera module 612 is fixedly mounted on a predetermined position on an outer side of the robot cleaner 600, and provides image data generated by capturing an ambient image. The camera module 612 may be configured to mechanically adjust a direction of a photography lens, and may adjust a direction of the photography lens to an upper/lower/left/right side by a predetermined degree, or may execute zooming in/out, in response to the control command from the controller 610.

The user interface 614 is configured to include a key input unit to set on/off of a power of the robot cleaner 600, an unique function of the robot (for example, a cleaning function and the like), and a display unit indicating a state, a function, a communication state, and the like of the robot cleaner 600. The sensor module 616 is configured to include a heat sensor, a motion sensor, or the like, and reports, to the controller 610, that a motion is sensed when the motion is sensed within a detectable range. The communication module 618 is configured to include a mobile communication module and/or a wireless LAN communication module, and may transmit and receive a wireless signal to/from a home gateway and/or an external apparatus. In particular, the communication module 618 receives a control command from a home gateway through a wireless LAN or Zigbee, and may transmit image data collected by the camera module 612 to the home gateway through a wireless LAN or a mobile communication scheme.

The storage unit 620 may store image data captured by the camera module 612 under a control of the controller 610 during a predetermined period of time or up to a predetermined capacity, and may temporarily store data processed for image monitoring by the robot cleaner 600. Also, the storage unit 620 may further include at least one of additional information required for a movement of the robot cleaner 600, for example, an arrangement plan including an arrangement of a room, a kitchen, a living room, and a bathroom in a house, information associated with a docking position, for example, a charging system, information associated with at least one target position to be monitored, and movement commands for a movement between the docking position and the target position.

The cleaning motor 622 is operated based on a control of the controller 610 and executes a cleaning function of the robot cleaner 600. The movement motor 624 is operated based on a control of the controller 610, so as to enable the robot cleaner 600 to move forward or backward. The direction motor 626 is operated based on a control of the controller 610, so as to enable the robot cleaner 600 to change a direction of a movement. The power supplier 628 supplies a voltage stored in a rechargeable battery to each operation circuit required for driving the robot cleaner 600, and charges the rechargeable battery with power supplied from the outside.

In the home network system configured as shown in FIG. 5, a home gateway registers information associated with home devices installed inside/outside a house, and controls and manages the registered home devices. For example, when a new home device is installed, the home gateway collects and stores at least one of information associated with the home device, for example, an identifier of the home device, positional information, capacity information, and state information. The information associated with the home device may be directly obtained from the home device through a service discovery procedure between the home gateway and the home device, may be received by the home gateway from a server on the Internet based on identification information provided from the home device, or may be directly input to the home gateway by a user or a system administrator. For example, when a user purchases and installs a new home device, and inputs, into the home gateway, identification information provided through instructions, for example, a serial number, a model number, a Quick Response (QR) code, the home gateway may connect with a server of a manufacturer on the Internet based on the identification information so as to obtain the information associated with the home device.

Figure 7:
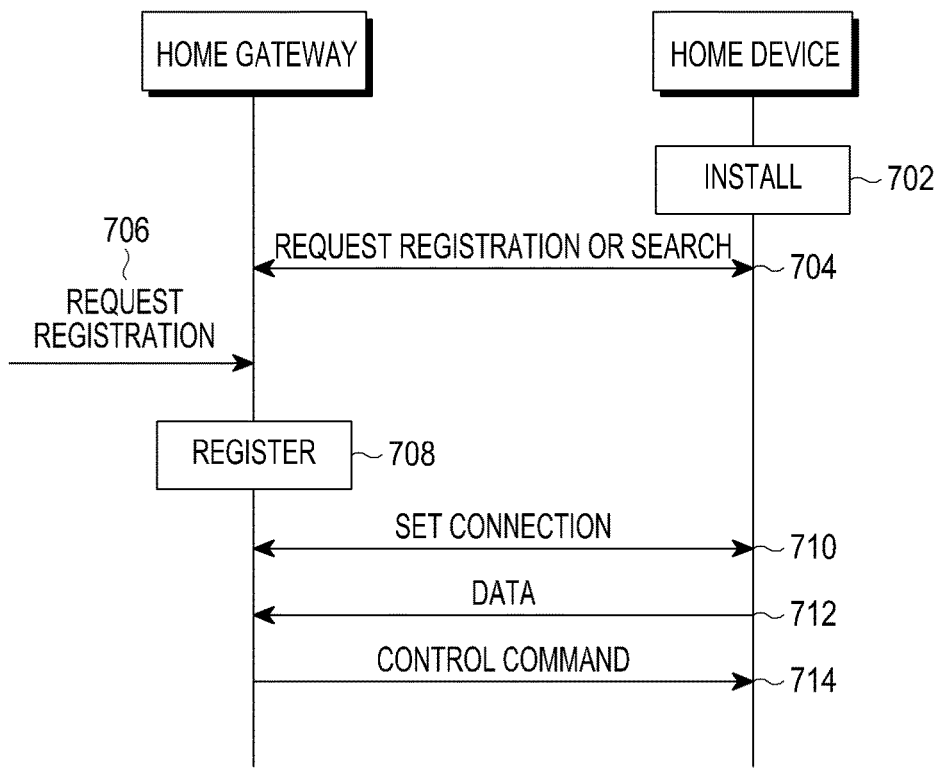
FIG. 7 is a message flowchart illustrating a registration procedure of a home device according to an embodiment of the present disclosure.

FIG. 7 is a message flowchart illustrating a registration procedure of a home device according to an embodiment of the present disclosure.

Referring to FIG. 7, a home device is installed and power is supplied first in step 702. Alternatively, a user determines to register a previously installed home device in a home gateway. In step 704, the home gateway executes a search procedure for a home device. For example, when providing that the home device is connected with the home gateway through WiFi, the home gateway executes a search procedure for a new device around the home gateway, periodically or in response to a request from a user. When a home device is detected by the home gateway through the search procedure, the home gateway may receive information associated with the home device from the home device. The information associated with the home device includes at least one of an identifier of the home device, capacity information, and state information. For example, when the home device is a security camera, the capacity information includes whether an angle of the security camera is adjustable, whether the security camera supports zooming in/out, and the like. The state information includes a position where the security camera is installed.

As an optional embodiment, in step 706, the home gateway receives a registration request associated with a home device to be registered, directly from a user through an its own user interface, a control console connected by an external interface, or a computer on the Internet, and receives an input of information associated with the home device from the user. As another embodiment, the home gateway may obtain identification information associated with a home device and/or state information from the home device or a user, and may obtain capacity information associated with the home device by connecting with a server of a manufacturer on the Internet based on the identification information.

In step 708, the home gateway stores the information associated with the home device, and manages the home device as a registered home device. As an optional embodiment, the home gateway may receive an input of additional information associated with the home device directly from a user or from a remote control terminal through the Internet or WiFi. The additional information may include at least one of, for example, a name or a nickname of the home device, and a position where the home device is installed.

As another optional embodiment, the home gateway may receive an input of additional information associated with a mode and/or authority of the home device directly from a user or from a remote control terminal through the Internet or WiFi. The additional information includes, for example, a level of access right with respect to the home device. The level of the access right includes, for example, a priority of authority, allowing only an access through a home gateway, allowing an access by a registered remote control terminal, allowing an access by a remote control terminal registered in the home gateway, or the like.

In step 710, the home gateway sets a connection with the home device when needed. Setting of the connection may be executed based on a procedure determined in a communication scheme between the home gateway and the home device, that is, WiFi, Zigbee, Bluetooth, NFC, or a wired communication scheme. As described above, when a connection between the home gateway and the home device is set, in step 712, the home device may transmit data to the home gateway through the set connection when needed. As an embodiment, when the home device is a security camera or an electrical appliance equipped with a security camera function, the home device transmits captured image data to the home gateway in real time. Also, when needed, in step 714, the home gateway transmits a control command to the home device. As an example, the home gateway transmits an angle adjusting command and/or zooming in/out command for a security camera included in a home device, and the home device adjusts an angle of a camera lens or executes zooming in/out in response to the command, and continuously transmits image data captured in the adjusted condition. As another embodiment, when the home device is an air-conditioner, the control command may include a desired temperature, a desired wind intensity, an operation time, a scheduled time, and the like. According to a communication scheme that is applied, the home device may provide the home gateway with a result of execution of the control command as a response.

In the home network system configured as shown in FIG. 5, a user registers a Personal Computer (PC) or a mobile terminal (Mobile Station (MS)) for remote controlling in the home gateway, and the home gateway restrictively allows remote controlling by the registered PC or mobile terminal. As an example, the user may register, in the home gateway, a mobile terminal to be used for remote controlling, manually or through use of a mobile communication network or WiFi, and the home gateway receives and stores information associated with the mobile terminal, for example, an identifier of the mobile terminal, authority for remote controlling, and information associated with a user mode. The information associated with the mobile terminal may be obtained directly from the mobile terminal through a connection between the home gateway and the mobile terminal, may be received by the home gateway from a server of a wireless communication system based on identification information provided from the mobile terminal, or may be input directly to the home gateway from a user or a system administrator.

Figure 8:
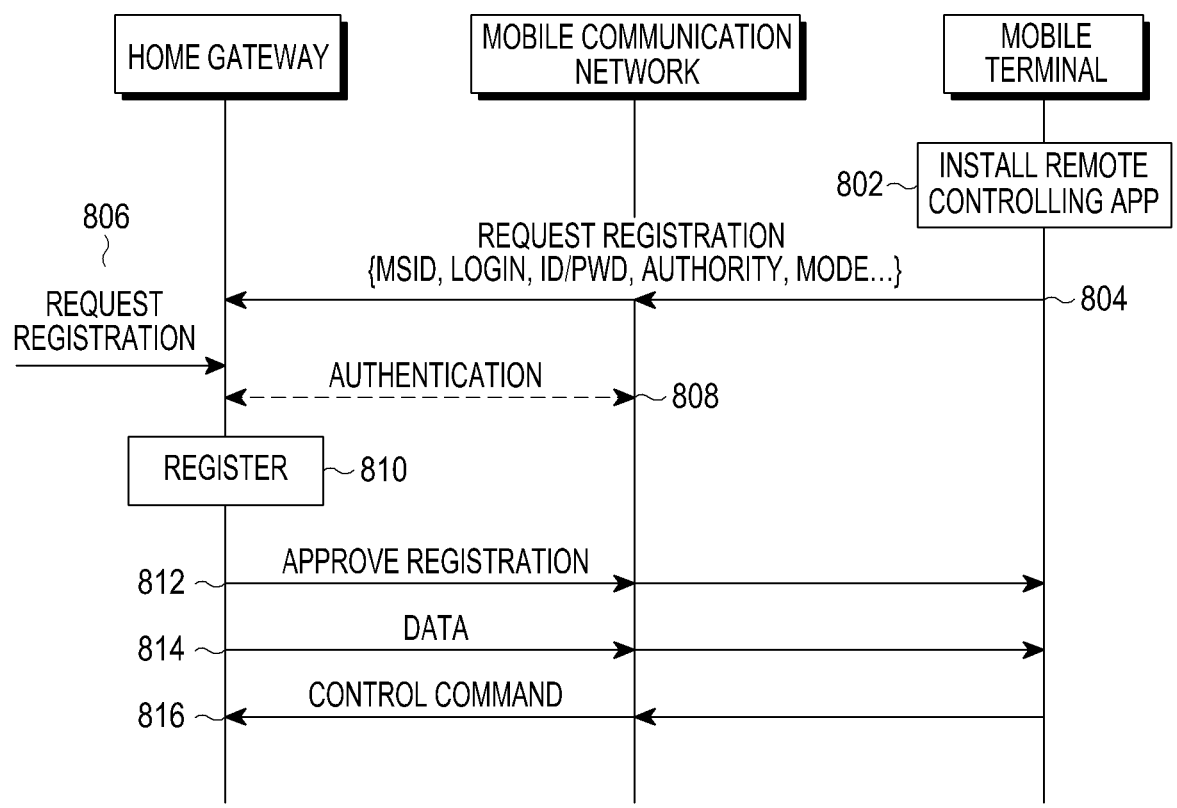
FIG. 8 is a message flowchart illustrating a registration procedure of a mobile terminal according to an embodiment of the present disclosure.

FIG. 8 is a message flowchart illustrating a registration procedure of a mobile terminal according to an embodiment of the present disclosure.

Referring to FIG. 8, a mobile terminal installs a remote controlling application (hereinafter referred to as an app) that supports controlling of a home network system in step 802. As an optional embodiment, installation of the remote controlling app may be limited to only a mobile terminal of a user that passes a predetermined authentication procedure. As an example, the home gateway provides an authentication code, and the home gateway, a server of a manufacturer of the home gateway, or a server for providing a remote controlling app allows downloading of the remote controlling app only to a mobile terminal of a user who inputs the authentication code. As another optional embodiment, the remote controlling application may restrictively provide a function based on an authority level of a mobile terminal. As an example, the remote controlling app may selectively provide, based on an authority level permitted by the home gateway, at least one of the functions of inquiring about information through the home gateway, receiving an alarm from the home gateway, partially controlling home devices, and completely controlling home devices.

In step 804, the mobile terminal executes the remote controlling app, and transmits, to the home gateway, a registration request message through the remote controlling app. The remote controlling app may be transferred to the home gateway through the Internet, or may be directly transferred to the home gateway through WiFi. The registration request message includes an identifier of the mobile terminal (for example, an MSID (MS Identifier) or IMSI (International Mobile Subscriber Identify)), a login ID and password, authority information, and mode information. The authority information indicates a level of access right with respect to a home network system, for example, allowing inquiring about information through the home gateway, allowing receiving of an alarm from the home gateway, partially allowing controlling on home devices, and completely allowing controlling on home devices.

As an optional embodiment, in step 806, the home gateway receives the registration request associated with the mobile terminal to be registered, from a user through an its own user interface, a control console connected by an external interface, or a computer on the Internet, and receives an input of information associated with the mobile terminal, for example, authority information and/or mode information from the user.

As an optional embodiment, in step 808, the home gateway connects with a subscriber server of a mobile communication network based on identification information associated with the mobile terminal obtained from the mobile terminal or a user, so as to authenticate the mobile terminal. When the authority information of the mobile terminal is not input, the home gateway may generate authority information associated with the mobile terminal based on a result of the authentication.

In step 810, the home gateway stores the information associated with the mobile terminal, and manages the mobile terminal as a registered mobile terminal. In step 812, the home gateway transmits, to the mobile terminal, a registration approval message indicating that registration of the information associated with the mobile terminal succeeds.

In step 814, when needed, the home gateway may transmit, to the mobile terminal, data required for remote controlling. As an embodiment, the home gateway transmits, to the mobile terminal, image data captured by at least one security camera installed inside/outside a house, in real time, periodically, or in an event triggering manner. As another embodiment, the home gateway transmits, to the mobile terminal, state information associated with a light in/around a house, power consumption, and an open/shut state of a door, in real time, periodically, or in an event triggering manner. In step 816, when needed, the mobile terminal transmits, to the home gateway, a control command for the home gateway or at least one home device. As an example, the mobile terminal requests the home gateway to transmit image data captured by a security camera installed in a predetermined position in real time. As another embodiment, the mobile terminal transmits an angle adjusting command and/or a zooming in/out command to a security camera through the home gateway.

Figure 9:
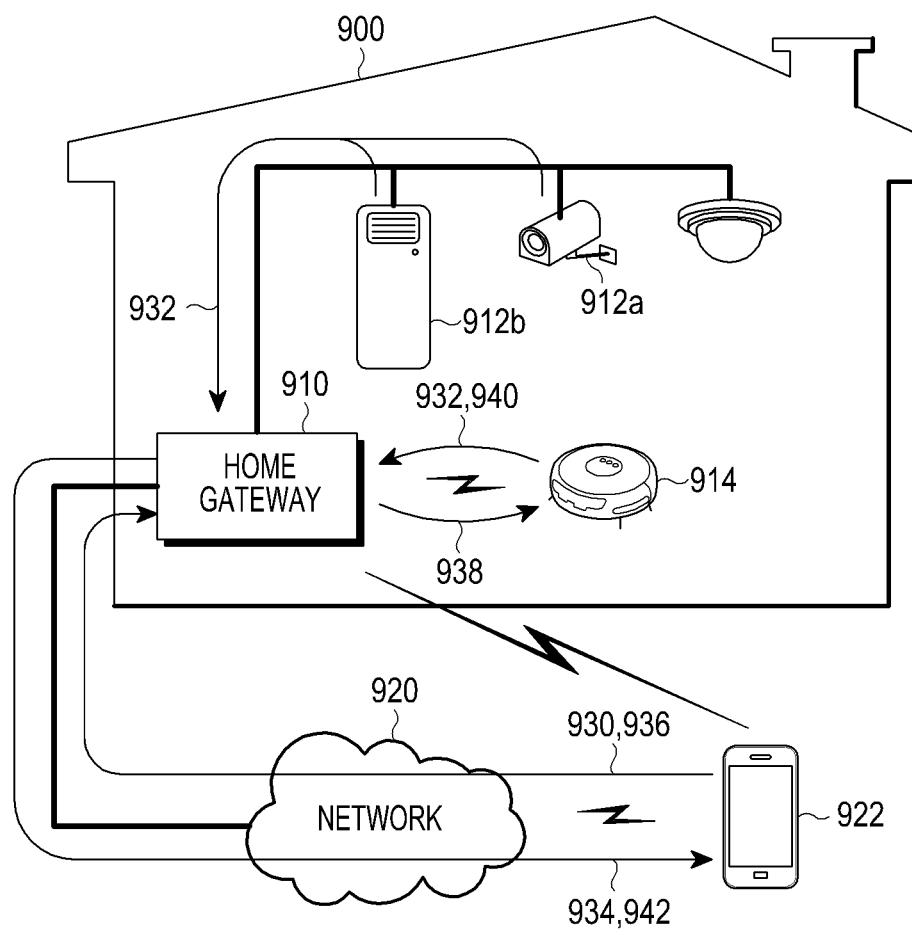
FIG. 9 illustrates a home monitoring procedure that is performed in a home network system according to an embodiment of the present disclosure.

FIG. 9 illustrates a home monitoring procedure that is performed in a home network system according to an embodiment of the present disclosure.

Referring to FIG. 9, a home network system 900 includes a home gateway 910, at least one stationary home device 912a and 912b (commonly called 912) equipped with a camera, and at least one mobile home device 914 equipped with a camera. The stationary home device 912 may be a CCTV installed in a predetermined position such as a wall or a ceiling, an electrical appliance equipped with a camera module such as an air-conditioner or a refrigerator, and the like, and may be connected with the home gateway 910 through a wired interface or may be connected with the home gateway 910 through a wireless interface. The mobile home device 914 may be a robot cleaner, a mobile toy, or the like that includes a movement function, and may be connected with the home gateway 910 through a wireless interface.

The home gateway 910 may operate the home network system 900 in a security mode based on a request from a user or a predetermined setting. When the security mode is begun, the home device 912 and 914 equipped with a camera begins capturing image data, and stores the image data or reports the image data to the home gateway 910. As an embodiment, when the security mode is begun, the home gateway 910 instructs the mobile home device 914 to move to a predetermined position that is set in advance, for example, a window in a kitchen, a back door, or the like, and to execute capturing image data and a sensing function, in response to a request from a user. In particular, the mobile home device 914 may be used for strengthening monitoring of a position where a stationary sensing module is not installed and is vulnerable to security.

When a user who is located outside the home network system 900 desires to check circumstances inside/around a house, the user may executes a remote controlling app that supports home monitoring through a mobile terminal 922 and selects a home monitoring function. Then, in step 930, the mobile terminal 922 connects with the home gateway 910 directly or through a network 920, and transmits a request message for requesting home monitoring to the home gateway 910. In step 932, the home gateway 910 collects image data from at least one home device 912 and 914 equipped with a camera, in response to the request message. In step 934, the home gateway 910 transmits, to the mobile terminal 922, the image data collected from the at least one home device 912 and 914. The mobile terminal 922 displays the image data so that a user checks the image data.

As an embodiment, the home gateway 910 collects the image data from all of the home devices 912 and 914 equipped with a camera in a system, and provides the image data to the mobile terminal 922. As another embodiment, the home gateway 910 collects the image data from at least one home device 912 and 914 registered in advance for home monitoring, and provides the image data to the mobile terminal 922.

The image data may be transferred in an original resolution or in a form of a compressed small resolution, based on a setting of a remote controlling app executed in the mobile terminal 922. When the home device 912 and 914 transmits image data to the home gateway 910 in real time, and the home gateway 910 stores the image data, the home gateway 910 transmits, to the mobile terminal 922, the image data collected in real time without a request for transmission of the image data. As another embodiment, when the home gateway 910 receives a request message for requesting home monitoring from the mobile terminal 922, the home gateway 910 requests at least one home device 912 and 914 to transmit image data and receives the image data from the home device 912 and 914 in response to the request.

In step 936, the mobile terminal 922 transmits, to the home gateway 910, a control command for selecting an image of another camera, or for adjusting a position, an angle, a zoom of a predetermined camera. In step 938, the home gateway 910 transfers the control command to a home device (for example, the home device 914) equipped with a selected camera. The home device 914 transfers, to the home gateway 910, image data captured after moving or controlling a camera lens in response to the control command in step 940, and the home gateway 910 transfers the image data to the mobile terminal 922 in step 942. The mobile terminal 922 displays the image data so that the user checks the image data.

Figure 10:
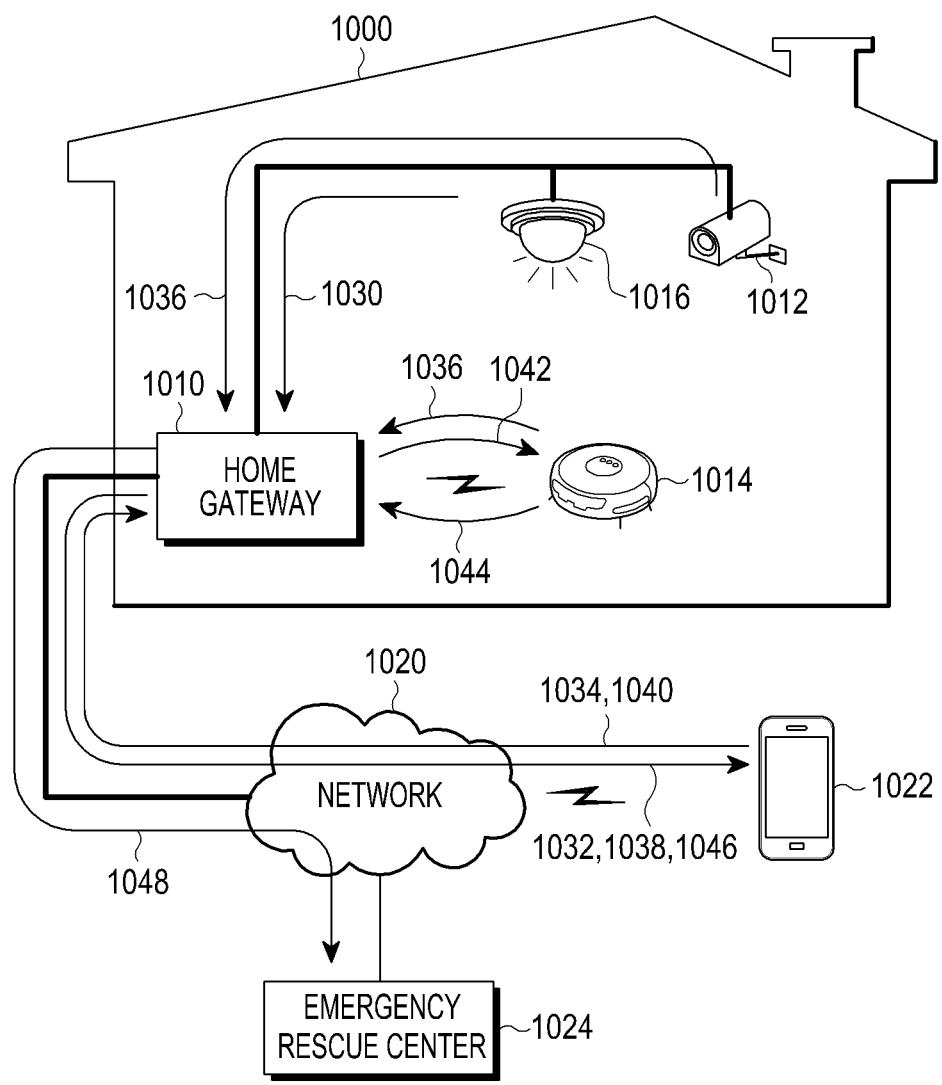
FIG. 10 illustrates a home monitoring procedure that is performed in a home network system according to another embodiment of the present disclosure.

FIG. 10 illustrates a home monitoring procedure that is performed in a home network system according to another embodiment of the present disclosure.

Referring to FIG. 10, a home network system 1000 includes a home gateway 1010, at least one stationary home device 1012 equipped with a camera, and at least one mobile home device 1014 equipped with a camera. The stationary home device 1012 may be a CCTV installed in a predetermined position such as a wall or a ceiling, an electrical appliance equipped with a camera module such as an air-conditioner or a refrigerator, and the like, and may be connected with the home gateway 1010 through a wired interface or may be connected with the home gateway 1010 through a wireless interface.

The mobile home device 1014 may be a robot cleaner, a mobile toy, or the like that includes a movement function, and may be connected with the home gateway 1010 through a wireless interface. At least one of the home devices 1010 and 1014 includes a function of sensing a movement through a camera or a sensor, and may report a movement sensing result to the home gateway 1010. Also, at least one of the home devices 1012 and 1014 may be equipped with a light such as an LED so as to capture an image in a dark room.

One or more sensing modules 1016 may be installed in a position that is determined to be monitored or may be included in the mobile home device 1014, and may be connected with the home gateway 1010 through a wired or wireless interface. The sensing module 1016 may be a door sensor that senses intrusion through a front door, a magnetic sensor that senses breaking into a window, a ultrasonic sensor, a gas sensor that senses a leakage of gas from a gas range or the like, a heat sensor that senses a fire, and a movement sensor that senses a movement of an intruder or a pet, and may include a signal transmitting module that wiredly or wirelessly transmits an abnormal signal including corresponding identification information when an abnormal circumstance is sensed while a home network system operates in a security mode. The abnormal signal may be collected by the home gateway 1010 or may be directly transferred to the home devices 1012 and 1014 equipped with a camera.

The home gateway 1010 may operate the home network system 1000 in a security mode based on a request from a user or a predetermined setting. When the security mode is begun, the home device 1010 and 1014 equipped with a camera begins capturing image data, and stores the image data or reports the image data to the home gateway 910. The home gateway 1010 may store movement commands that instruct the mobile home device 1014 to arrive on at least one target position that requires additional monitoring, for example, a position where a sensing module is not installed, a position having a high probability of intrusion, a place where a child or pet exists, or the like, together with time information. The mobile home device 1014 may be configured to execute capturing image data and a sensing operation by patrolling a path between a docking position and at least one target position when a security mode operates. The mobile home device 1014 may store the movement commands by itself.

In the security mode, the sensing module 1016 begins a sensing operation.

In step 1030, the sensing module 1016 senses an abnormal circumstance, and transmits, an abnormal signal including its identification information to the home gateway 1010. As an optional embodiment, when the home gateway 1010 is capable of identifying an identity or a position of the sensing module 1016 through a wired or wireless connection, transmission of the identification information may be omitted.

In step 1032, the home gateway 1010 transmits an alarm message associated with an abnormal circumstance to at least one registered mobile terminal 1022 in response to the reception of the abnormal signal, and the mobile terminal 1022 may display or output a warning message in response to the reception of the alarm message from the home gateway 1010. As an optional embodiment, the home gateway 1010 determines whether to inform the mobile terminal 1022 of an abnormal circumstance sensed by the sensing module 1016, based on scenarios registered in advance. As an embodiment, when a user goes out, the user may register, in the home gateway 1010, a scenario in which a child or a pet is located in a main room. Then, the home gateway 1010 determines heat or a movement sensed from the main room as a normal circumstance, and determines not to transmit an alarm message to the mobile terminal 1022. As another embodiment, when food is being cooked or is scheduled to be cooked in a kitchen, a user may register, in the home gateway 1010, a scenario in which heat is generated in a kitchen. Then, the home gateway 1010 determines heat or a movement sensed from the kitchen as a normal circumstance, and determines not to transmit an alarm message to the mobile terminal 1022. When a circumstance besides the registered scenario happens, the home gateway 1010 determines to inform the mobile terminal 1022 of an abnormal circumstance. As another embodiment, when a circumstance corresponding to a registered abnormal scenario happens, such as sensing that a front door or a window is open, sensing a movement, and the like, the home gateway 1010 determines to inform the mobile terminal 1022 of an abnormal circumstance.

In step 1034, the mobile terminal 1022 executes a remote controlling app that supports home monitoring, automatically or based on an input of a user (a touch or a voice), in response to the reception of the alarm message from the home gateway 1010, so as to connect with the home gateway 1010 through the network 1020, and to transmit, to the home gateway 1010, a request message for requesting home monitoring.

The home gateway 1010 collects image data from at least one home device 1012 and 1014 equipped with a camera, in response to the request message in step 1036, and transmits the collected image data to the mobile terminal 1022 in step 1038. The mobile terminal 1022 displays the image data so that a user checks the image data.

As an embodiment, the home gateway 1010 collects image data from the at least one home device 1012 and 1014 that is registered in advance and located in an identical space (for example, a room) where the sensing module 1016 that senses an abnormal circumstance exists, and provides the collected image data to the mobile terminal 1022. As another embodiment, the home gateway 1010 collects image data from all of the home devices 1012 and 1014 equipped with a camera, and provides the image data to the mobile terminal 1022. As another embodiment, the home gateway 1010 collects the image data from at least one home device 1012 and 1014 registered in advance for home monitoring, and provides the image data to the mobile terminal 1022.

The image data may be transferred in an original resolution or in a form of a compressed small resolution, based on a setting of a remote controlling app executed in the mobile terminal 1022. When the home device 1012 and 1014 transmits image data to the home gateway 1010 in real time, and the home gateway 1010 stores the image data, the home gateway 1010 transmits, to the mobile terminal 1022, the image data collected in real time without a request for transmission of the image data. As another embodiment, when the home gateway 1010 receives a request message for requesting home monitoring from the mobile terminal 1022, the home gateway 1010 requests at least one home device 1012 and 1014 to transmit image data and receives the image data from the home device 1012 and 1014 in response to the request.

In step 1040, the mobile terminal 1022 transmits, to the home gateway 1010, a control command for selecting an image of another camera, or for adjusting a position, an angle, a zoom of a predetermined camera. In step 1042, the home gateway 1010 transfers the control command to a home device (for example, the home device 1014) equipped with a selected camera. The home device 1014 transfers, to the home gateway 1010, image data captured after moving or controlling a camera lens in response to the control command in step 1044, and the home gateway 1010 transfers the image data to the mobile terminal 1022 in step 1046. The mobile terminal 1022 displays the image data so that a user checks the image data.

When an abnormal signal is received from the sensing module 1016, the home gateway 1010 may transmit an alarm message to the mobile terminal 1022 and may transmit an alarm message to an emergency rescue center 1024 in step 1048. The alarm message includes information associated with an abnormal circumstance and a location where an abnormal circumstance occurs (a home address and the like), and may be transmitted to the emergency rescue center 1024 through the network 1020 such as the Internet. Contacts (a phone number, a destination IP address, and the like) of the emergency rescue center 1024 may be set in advance in the home gateway 1010 by a user or a manufacturer. The emergency rescue center 1024 may be, for example, a police station, a police box, a fire station, a 119 center, a fire station, or a security office or a private security service company of an apartment, a building, and the like corresponding to a building complex or a collective housing.

Figure 11:
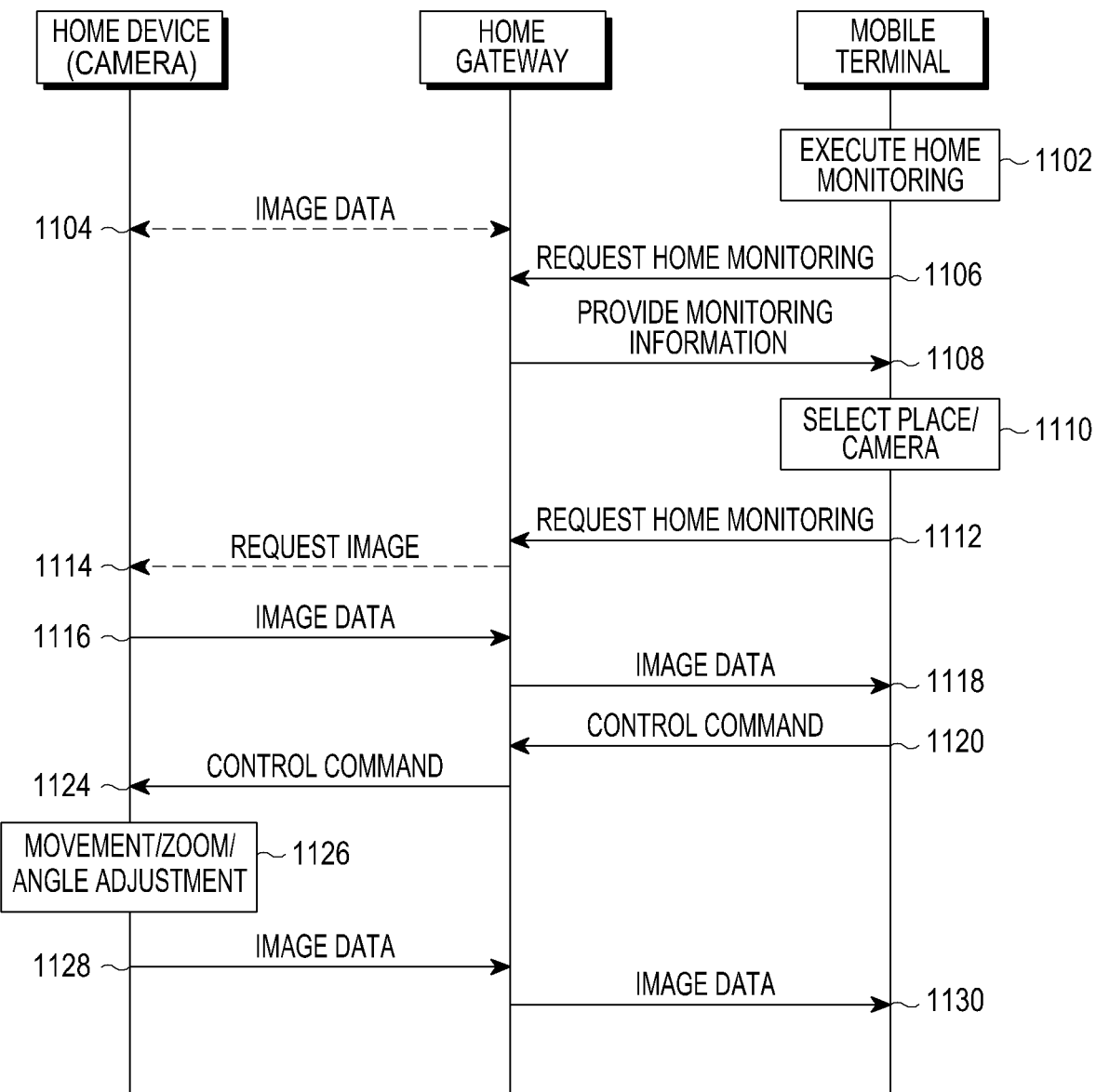
FIG. 11 is a message flowchart illustrating a home monitoring procedure according to an embodiment of the present disclosure.

FIG. 11 is a message flowchart illustrating a home monitoring procedure according to an embodiment of the present disclosure.

Referring to FIG. 11, in step 1102, a mobile terminal executes a remote controlling app including a home monitoring function in response to a request from a user (a touch input or a voice command) or according to an execution condition set in advance. When the remote controlling app is executed, the remote controlling app connects with a home gateway to execute a login procedure or determines a login procedure performed in advance to permit a connection with the home gateway. In step 1104, the home gateway collects and stores image data from at least one home device that includes a camera module and is installed in a home network system, in real time or periodically, irrespective of a request for home monitoring from the mobile terminal.

In step 1106, the mobile terminal transmits a home monitoring request message to the home gateway through the remote controlling app. The home monitoring request message includes at least one of a login ID and password for a connection with the home gateway, an identifier of the mobile terminal, and authentication information obtained in advance. As an optional embodiment, when a request for a section where a user desires to monitor (room 1/room 2/kitchen/living room and the like) is input, the home monitoring request message may further include information associated with the section where the user desires to monitor.

In step 1108, the home gateway determines authority of the mobile terminal in response to the home monitoring request message, and when the mobile terminal has an authority level that is capable of receiving image data for home monitoring, transfers, to the mobile terminal, monitoring information associated with positions to be monitored in a house and/or at least one home device including a camera module. The monitoring information may include positions that may be monitored or is being monitored (for example, a room/living room/kitchen and the like) and camera information associated with each installed camera module. The camera information includes at least one of a position, a type (for example, a mobile/stationary type and the like) and a state (for example, an activated/deactivated state, a state of being charged, a movable state, a wireless signal intensity measured by a home gateway, and the like). The monitoring information may further include a thumbnail still image or thumbnail video of image data collected by each camera module.

In step 1110, the mobile terminal identifies the monitoring information through the remote controlling app, and selects a place or camera that is desired to be checked. In step 1112, the mobile terminal transmits, to the home gateway, the home monitoring request message including indication information that indicates the selected place or camera.

When image data is not reported from a home device associated with a place or a camera module requested by the indication information, the home gateway requests the home device corresponding to the indication information to transmit the image data in response to the home monitoring request message in step 1114. When it is determined that a home device having a camera module does not exist in the place requested by the indication information, the home gateway transmits an image request including a command that instructs a home device having a camera module and a moveable means, for example, a robot cleaner or a mobile toy, to move to the requested place and to collect an image. In step 1116, the home gateway receives image data from a corresponding home device. When the home gateway collects image data from a home device in real time, step 1114 may be omitted.

In step 1118, the home gateway transmits, to the mobile terminal, image data associated with a place or a camera requested by the mobile terminal, and the mobile terminal displays the image data to enable a user to check the image data. As an embodiment, the image data may be transmitted to the mobile terminal, together with a name of a corresponding place, camera information associated with a corresponding camera module, or identification information of a home device equipped with a camera module. The mobile terminal may display the image data together with the name of the place, camera information, and/or identification information.

As an optional embodiment, when the mobile terminal transmits information associated with a section (room 1/room 2/kitchen/living room and the like) for which monitoring is desired, through the home monitoring request message of step 1106, steps 1108 through 1112 may be omitted, and the home gateway may proceed with step 1118 so as to transmit, to the mobile terminal, image data captured by a camera installed in a corresponding section.

While displaying the image data, the mobile terminal may receive an input of a command for controlling a predetermined camera from a user. The control command includes at least one of adjusting an angle of a camera, zooming in/out, and moving a home device equipped with a camera, and may further include indication information indicating a camera that is desired to be controlled. As an optional embodiment, the control command may further include a command for controlling an operation of a predetermined home device equipped with a camera. As an embodiment, when the home device is a moveable robot cleaner, the mobile terminal receives, from a user, an input of a command for executing cleaning through a voice or manipulating a screen, and generates a control command corresponding to the input command.

The mobile terminal transmits, to the home gateway, a control command input by a user with respect to a predetermined home device in step 1120, and the home gateway transmits the control command to the corresponding home device in step 1124. In step 1126, the home device adjusts an angle of a camera to an upper/lower/left/right side, executes zooming in/out, executes left/right rotation, or executes forward/backward movement, in response to the control command. As an embodiment, when the home device is a robot cleaner and the control command instructs to generate an alarm sound, the robot cleaner outputs an alarm sound in response to the control command from the home gateway. Although it will not be illustrated, as an optional embodiment, the home device reports, to the home gateway, an execution result (a progress of execution, execution being completed, and execution being impossible) associated with the control command, and the home gateway transfers the execution result to the mobile terminal.

The home device executes an operation associated with the control command, and continuously transmits image data to the home gateway in step 1128, and the home gateway transfers the image data to the mobile terminal so that the mobile terminal displays the image data in step 1130. The image data may be transmitted to the mobile terminal, together with camera information associated with a corresponding camera module or identification information associated with a corresponding home device.

Figure 12:
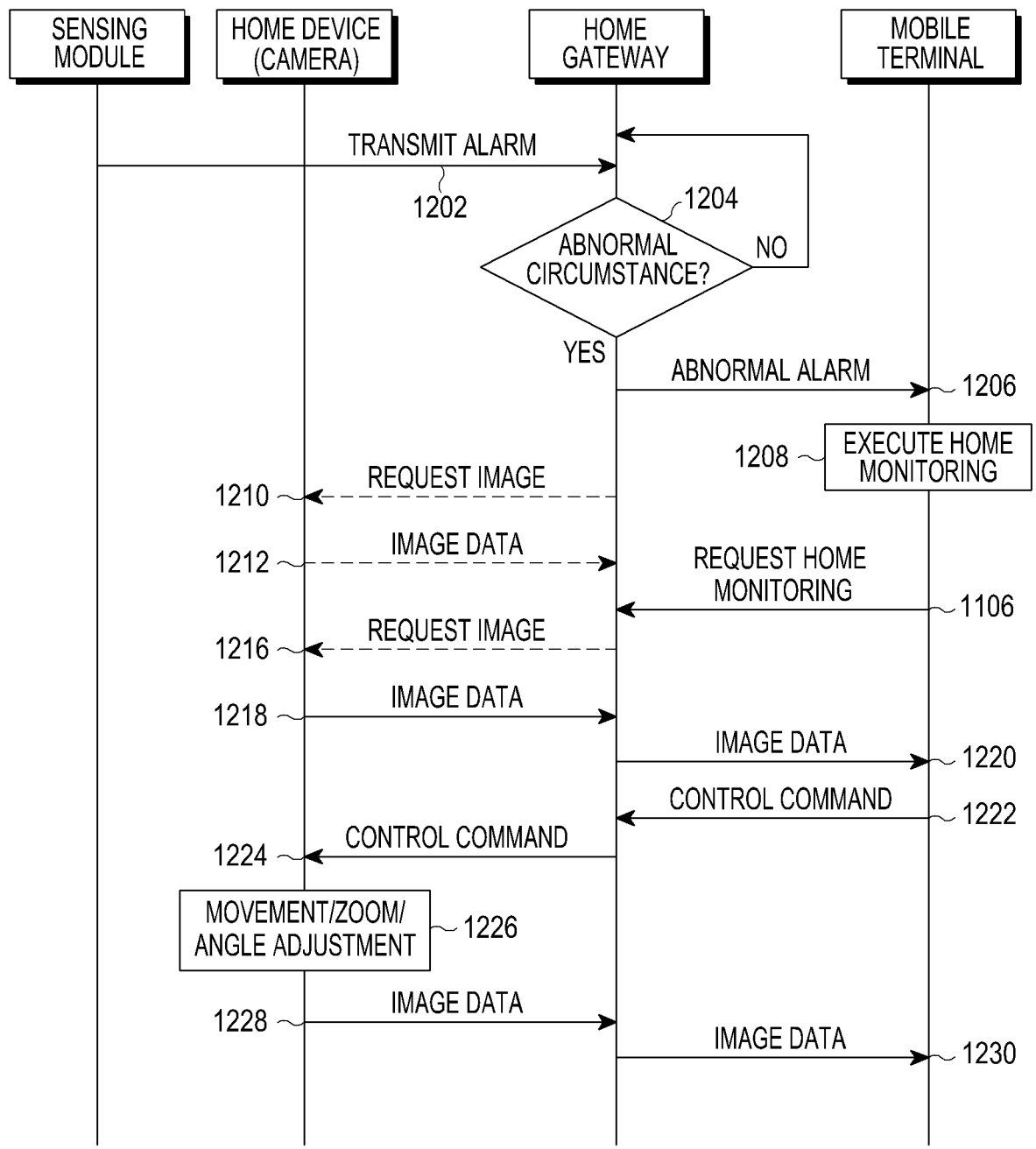
FIG. 12 is a message flowchart illustrating a home monitoring procedure according to another embodiment of the present disclosure.

FIG. 12 is a message flowchart illustrating a home monitoring procedure according to another embodiment of the present disclosure.

Referring to FIG. 12, in step 1202, at least one of the sensing modules installed in a home network system senses a corresponding abnormal circumstance, and reports an alarm including identification information of itself to a home gateway through a wired or wireless interface. In step 1204, the home gateway determines whether to inform at least one registered mobile terminal of the abnormal circumstance, in response to the alarm report. As an example, the home gateway may determine to inform a mobile terminal of abnormality when the generation of the alarm does not belong to a normal scenario registered in advance. When it is determined that the alarm belongs to the normal scenario, the home gateway does not inform the mobile terminal of the abnormal circumstance, and stores a sensed state (a movement, heat, a temperature, and the like) and a sensed position (a window, a room, a kitchen, a front door, and the like) associated with the alarm, together with time information. As another example, the home gateway may determine to inform a mobile terminal of abnormality when the generation of the alarm belongs to an abnormal scenario registered in advance.

In step 1206, the home gateway may inform at least one registered mobile terminal of an alarm message indicating the abnormal circumstance associated with the alarm. As an embodiment, the home gateway may inform, of the alarm, only at least one mobile terminal that has an access right set to allow reception of an alarm from among the registered mobile terminals. The alarm message of the abnormal circumstance may include information associated with a sensed state (a movement, heat, a temperature, and the like) and a sensed position (a window, a room, a kitchen, a front door, and the like) associated with the alarm.

When the home gateway does not collect and store image data in real time from at least one home device that includes a camera module and is installed in a house, the home gateway requests at least one home device in a home network system to start capturing and transmitting image data in response to the report of the alarm in step 1210. As an embodiment, the home gateway may request image data from a home device located in an identical space where the alarm is generated and/or an adjacent place, based on positional information associated with home devices registered in advance. As another embodiment, the home gateway requests all of the home devices equipped with a camera module in the system to collect and report image data.

When the sensing module that senses the abnormal circumstance in step 1202 is installed in a mobile home device including a camera module, the home gateway instructs the corresponding mobile home device to interrupt patrolling and to continuously collect image data at a corresponding place. When a home device including a camera module does not exist in a place/space where abnormality is sensed, the home gateway may instruct a mobile home device including a camera module, for example, a robot cleaner or a mobile toy, to move to the place where the abnormality is sensed and to collect and report an image, in step 1216. To this end, the home gateway may store movement commands in advance for moving a mobile home device from a docking position to predetermined positions. As another embodiment, the movement commands may be stored in a mobile home device, and the mobile home device may execute the movement commands based on a previously set rule, when the mobile home device is operated in a security mode.

In step 1212, the home gateway begins receiving image data from a corresponding home device, and stores the received image data.

As another embodiment, the home gateway may request all of the home devices including a camera module to capture and report image data, in response to the reception of the alarm of step 1202. The home gateway analyzes the reported image data, and combines a result of analysis of the image data and states of sensing modules so as to determine whether an abnormal circumstance occurs. As an example, the home gateway determines whether a person exists in a house, and may determine whether a person enters through a normal path based on states of the sensing modules. When it is determined as an abnormal circumstance, the home gateway may operate based on a determined procedure. As an example, the home gateway transmits a text/video to at least one registered mobile terminal, and/or transmits an alarm message to a police station or a security company.

As another embodiment, when an abnormal circumstance is sensed by a sensing module, the home device may immediately capture image data and begins to report the image data to the home gateway. To this end, the home device may be configured to enable communication with a sensing module, or to include a sensing module.

In step 1208, the mobile terminal executes a predetermined alarm operation in response to the reception of the alarm message. As an embodiment, the mobile terminal displays, on a screen, a text message, for example, "a movement is sensed in a front door", and may execute an additional alarm operation such as flashing an LED, generating an alarm sound, generating a vibration and the like. As another embodiment, the mobile terminal may automatically execute a remote controlling app for home monitoring in response to the reception of the alarm message. As another embodiment, the mobile terminal displays a shortcut icon for executing a remote controlling app on a screen in response to the reception of the alarm message, and executes the remote controlling app in response to a user input on the shortcut. When the remote controlling app is executed, the remote controlling app connects with the home gateway to execute a login procedure or determines a login procedure performed in advance to permit a connection with the home gateway.

In step 1214, the mobile terminal transmits a home monitoring request message to the home gateway through the remote controlling app. The home monitoring request message includes at least one of a login ID and password for a connection with the home gateway, an identifier of the mobile terminal, and authentication information obtained in advance. In step 1216, after authenticating a connection of the mobile terminal, when the home gateway does not collect image data from a home device located in a place where abnormality is sensed, the home gateway requests a corresponding home device to transmit image data in response to the home monitoring request message, and receives the image data from the home device in step 1218. When the home gateway collects image data from a home device in real time, step 1216 may be omitted.

In step 1220, the home gateway transmits, to the mobile terminal, the image data collected by the corresponding home device, and the mobile terminal displays the image data to enable a user to check the image data. According to an embodiment, the image data may be transmitted to the mobile terminal, together with camera information associated with a corresponding camera module or identification information of a home device equipped with a camera module. The mobile terminal may display the image data together with the camera information and/or the identification information. As another embodiment, when an abnormal circumstance is sensed in step 1204, the home gateway immediately proceeds with step 1220 so as to begin transmission of image data to the mobile terminal.

While displaying the image data, the mobile terminal may receive an input of a command for controlling a camera from a user. The control command instructs at least one of adjusting an angle of a camera, zooming in/out, and moving a home device equipped with a camera, and may further include indication information indicating a camera that is desired to be controlled.

The mobile terminal transmits, to the home gateway, the control command input by the user in step 1222, and the home gateway transmits the control command to the home device in step 1224. In step 1226, the home device adjusts an angle of a camera to an upper/lower/left/right side or executes zooming in/out, execute left/right rotation, or executes forward/backward movement, in response to the control command. The home device executes an operation associated with the control command, and continuously transmits image data to the home gateway in step 1228, and the home gateway transfers the image data to the mobile terminal in step 1230 so that the mobile terminal displays the image data. The image data may be transmitted to the mobile terminal, together with camera information associated with a corresponding camera module or identification information associated with a corresponding home device.

Figure 13:
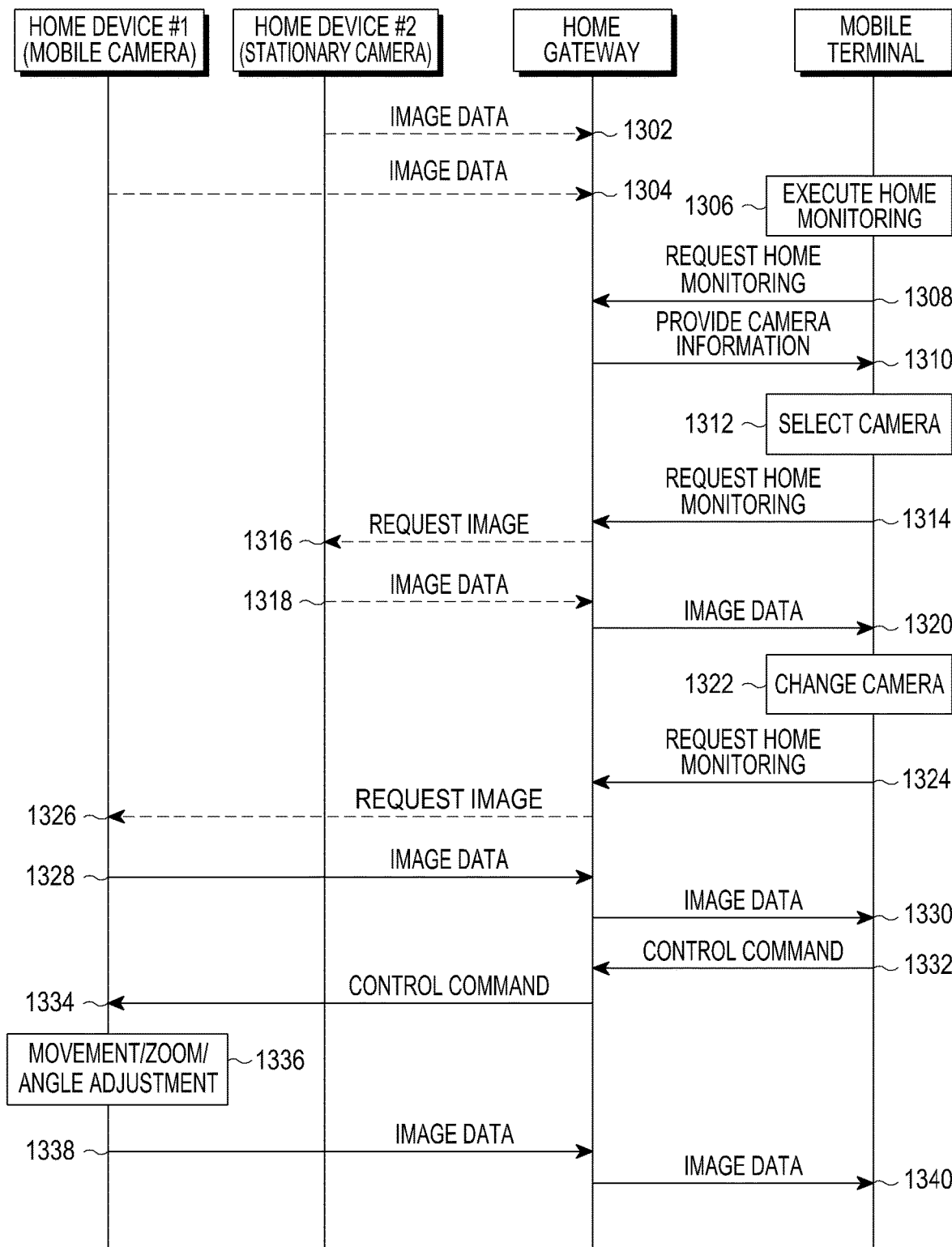
FIG. 13 is a message flowchart illustrating a home monitoring procedure according to another embodiment of the present disclosure.

FIG. 13 is a message flowchart illustrating a home monitoring procedure according to another embodiment of the present disclosure.

Referring to FIG. 13, in step 1306, a mobile terminal executes a remote controlling app including a home monitoring function in response to a request from a user or according to an execution condition set in advance. In steps 1302 and 1304, a home gateway collects and stores image data from at least one home device that includes a camera module and is installed in a home network system, in real time or periodically, irrespective of a request for home monitoring from the mobile terminal. Here, a home device #1 equipped with a mobile camera and a home device #2 equipped with a stationary camera are illustrated.

In step 1308, the mobile terminal transmits a home monitoring request message to the home gateway through the remote controlling app. In step 1310, the home gateway determines authority of the mobile terminal in response to the home monitoring request message, and when the mobile terminal has an authority level that is capable of receiving image data for home monitoring, transfers, to the mobile terminal, camera information associated with at least one home device that includes a camera module and is located in a house.

In step 1312, the mobile terminal identifies the camera information through the remote controlling app, and selects the home device #2 equipped with a camera of which an image is desired to be checked. In step 1314, the mobile terminal transmits, to the home gateway, the home monitoring request message including indication information that indicates the selected camera (or the home device #2).

In step 1316, when the home gateway does not collect image data from the home device #2, the home gateway requests the home device #2 to transmit image data in response to the home monitoring request message, and receives image data from the home device #2 in step 1318. When the home gateway collects image data from the home device #2 in real time, step 1316 may be omitted.

In step 1320, the home gateway transmits, to the mobile terminal, image data collected by the home device #2, and the mobile terminal displays the image data to enable a user to check the image data. According to an embodiment, the image data may be transmitted to the mobile terminal, together with camera information associated with a corresponding camera module or identification information of the home device #2. The mobile terminal may display the image data together with the camera information and/or the identification information.

While displaying the image data, the mobile terminal receives a request for changing the image data into image data of another camera from the user in step 1322. As an embodiment, the user inputs, into the mobile terminal, a command for changing from the home device #2 equipped with a stationary camera into the home device #1 equipped with a mobile camera. That is, when the user determines that the user has difficulty in fully checking a desired portion from an image captured by the stationary camera of the home device #2, the user determines changing a camera so as to capture the desired portion through use of the mobile camera of the home device #1. In step 1324, the mobile terminal transmits, to the home gateway, the home monitoring request message including indication information that indicates another camera to be used (or the home device #1).

In step 1326, when the home gateway does not collect image data from the home device #1, the home gateway requests the home device #1 to transmit image data in response to the home monitoring request message, and receives image data from the home device #2 in step 328. When the home gateway collects image data from the home device #1 in real time, step 1326 may be omitted.

In step 1330, the home gateway transmits, to the mobile terminal, image data collected by the home device #1, and the mobile terminal displays the image data to enable the user to check the image data. According to an embodiment, the image data may be transmitted to the mobile terminal, together with camera information associated with a corresponding camera module or identification information of the home device #1. The mobile terminal may display the image data together with the camera information and/or the identification information.

The mobile terminal transmits, to the home gateway, a control command for controlling a camera, which is input by the user while the mobile terminal displays image data, in step 1332, and the home gateway transmits the control command to the home device #1 in step 1334. In step 1336, the home device #1 adjusts an angle of a camera to an upper/lower/left/right side, executes zooming in/out, executes left/right rotation, or executes forward/backward movement, in response to the control command. The home device #1 executes an operation associated with the control command, and continuously transmits image data to the home gateway in step 1338, and the home gateway transfers the image data to the mobile terminal in step 1340 so that the mobile terminal displays the image data. The image data may be transmitted to the mobile terminal, together with camera information associated with a corresponding camera module or identification information associated with the home device #1.

Figure 14:
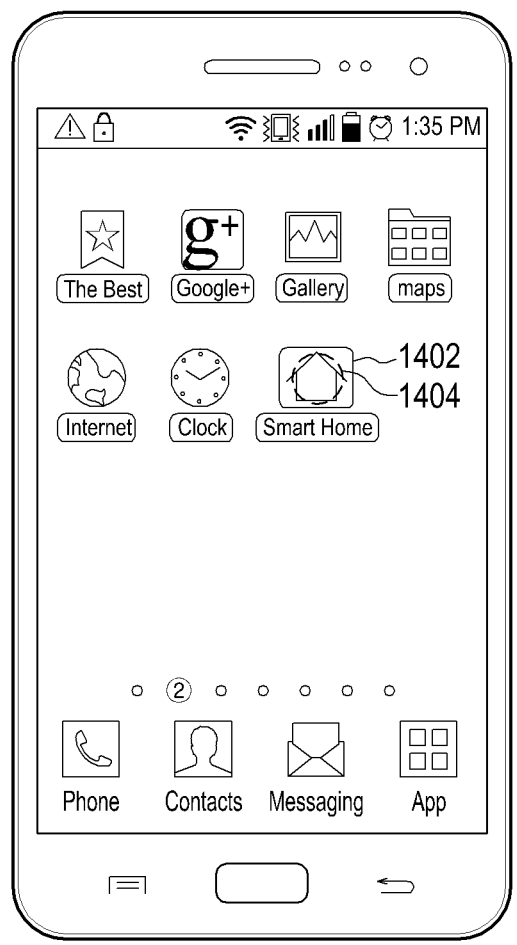
FIG. 14 illustrates a User Interface (UI) for executing a remote controlling application in a mobile terminal for home monitoring according to an embodiment of the present disclosure.

FIG. 14 illustrates a User Interface (UI) in a mobile terminal, for executing a remote controlling app according to an embodiment of the present disclosure. As illustrated in the diagram, the mobile terminal provides an application/widget icon 1402 for executing an installed remote controlling app, and executes the remote controlling app when sensing a user gesture 1404, for example, a touch, on the icon 1402.

As another embodiment, the mobile terminal provides an icon for inputting a voice command, and executes a remote controlling app so as to execute a corresponding home monitoring function when a user gesture is sensed on the icon or a voice command, for example, "Show me the living room", "Let me see my living room", or the like, is input.

Figure 15:
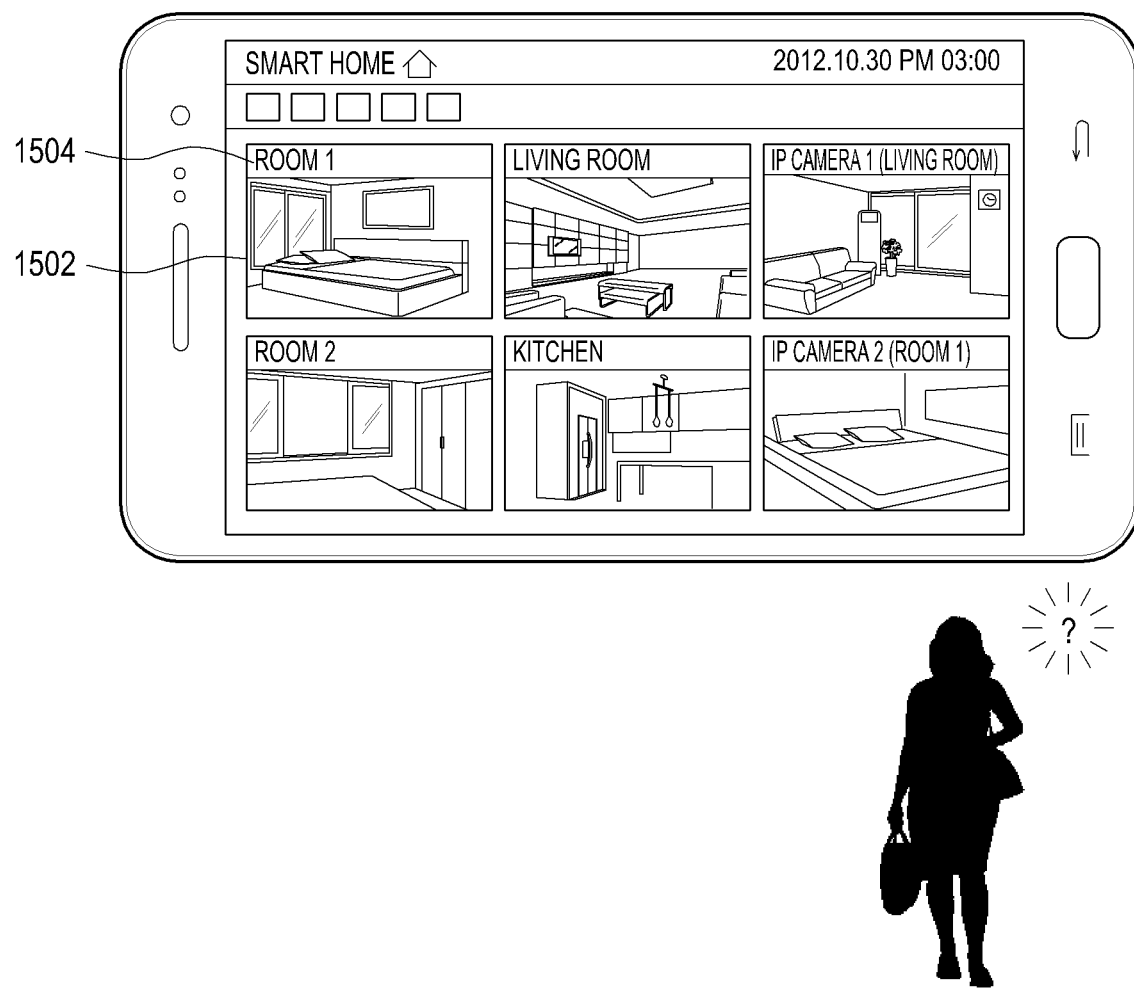
FIG. 15 illustrates a configuration of a screen for home monitoring of a remote controlling application according to an embodiment of the present disclosure.

FIG. 15 illustrates a configuration of a screen for home monitoring of a remote controlling app according to an embodiment of the present disclosure.

As illustrated in the diagram, when execution of a home monitoring function is requested by a user, and an authority level of a mobile terminal that is capable of inquiring about image data captured by a camera is approved by a home gateway, the remote controlling app displays thumbnail images 1502 of image data captured by camera modules installed in a home network system in a form of a lattice or a list. Each thumbnail image 1502 may be a thumbnail video captured in real time by a corresponding camera module, a thumbnail still image extracted based on the thumbnail video, or a thumbnail still image periodically collected from a camera module.

Each thumbnail image 1502 may be displayed, together with a title area including camera information corresponding to a corresponding camera module. The camera information includes at least one of a position (for example, a room/living room/kitchen and the like), a type (for example, a mobile type/stationary type and the like), and a state (for example, an activated/deactivated state/state of being charged/movable state and the like) of a corresponding camera module. For example, a first thumbnail image may be displayed together with a title of "room 1" or "room 1, stationary type", and a second thumbnail image may be displayed together with a title of "IP camera 1(living room)" or "IP camera 1(living room), mobile type".

As an optional embodiment, each thumbnail image 1502 may be displayed together with a symbol indicating that an abnormal circumstance is sensed from a section (rooms, a kitchen, a living room, a front door and the like) where a corresponding camera module is installed. That is, when an alarm message indicating that an abnormal circumstance is sensed in a predetermined position is received from the home gateway, the mobile terminal may display a symbol indicating the abnormal circumstance (sensing a door open, a movement, heat or the like) by flashing the symbol, together with a title of a corresponding thumbnail image of a corresponding section. As another embodiment, a thumbnail image associated with the abnormal circumstance may be displayed together with a flashing outline.

As an optional embodiment, only image data captured by a few of a plurality of cameras installed in the home network system may be provided from the home gateway to the mobile terminal. Then, the mobile terminal may deactivate a thumbnail image of a camera that is not approved (for example, shading).

Figure 16:
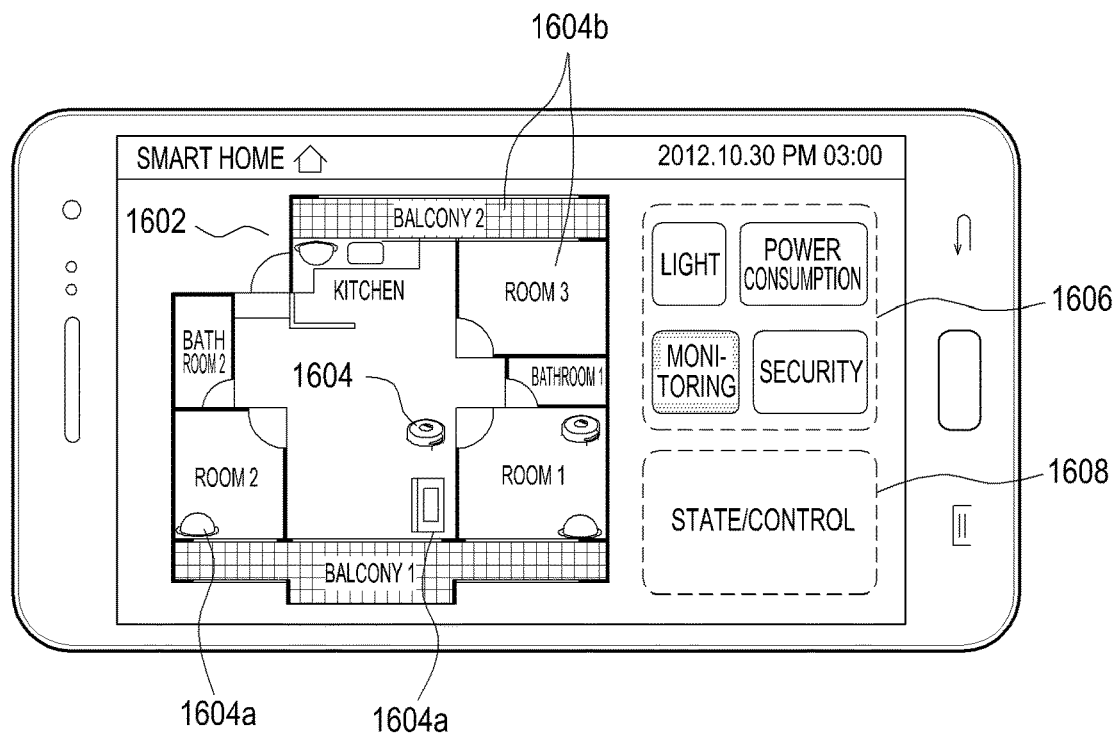
FIG. 16 illustrates a configuration of a screen for home monitoring of a remote controlling application according to another embodiment of the present disclosure.

FIG. 16 illustrates a configuration of a screen for home monitoring of a remote controlling app according to another embodiment of the present disclosure. Although a user interface of a remote controlling app executed in a smart phone is illustrated herein, a user interface of home monitoring according to an embodiment of the present disclosure may also be displayed through various types of electric devices such as a phone, a Tablet PC, a TV, and the like.

Referring to FIG. 16, a remote controlling app displays an arrangement plan 1602 of a house where a home network system is installed, when execution of a home monitoring function is requested by a user. The arrangement plan 1602 displays distinguished sections of an entire house, for example, rooms, a living room, a kitchen, a balcony, a front door, and the like, and includes symbols 1604 and 1604a indicating camera modules or home devices equipped with a camera module in positions where camera modules are installed in each section.

Each symbol 1604 and 1604a may be a small image similar to an actual shape of a corresponding camera module or home device, or may be a small image indicating a type (stationary or mobile type) of a corresponding camera module. Each symbol 1604 and 1604a may be represented in a color image or a black-and-white image so as to indicate whether a corresponding camera module is activated (or whether the camera module is inquirable). When an abnormal circumstance is sensed by a sensing module in a predetermined section or an adjacent sensing module, and a report associated with an abnormal circumstance is received from a home gateway to a mobile terminal, the mobile terminal may display the abnormal circumstance by flashing or brightly displaying the symbols 1604 or 1604a in a corresponding position.

The remote controlling app may display additional function keys 1608 for controlling a home network system, together with the arrangement plan 1602. The function keys 1608 may provide functions, for example, controlling a light, monitoring power consumption, monitoring an image, controlling security, and the like. Also, the remote controlling app may further display a state/control area 1606. The state/control area 1606 may selectively provide a display of a state, a display of a control key and the like for controlling/managing a home network system according to an authority level of the mobile terminal.

When a desired camera is selected by the user in a screen configuration for home monitoring, the remote controlling app may enlarge and display an image captured by the selected camera. As an example, when a user gesture is sensed on one of the thumbnail images 1502 of the screen of FIG. 15, or when a user gesture is sensed on one of the camera symbols 1604 and 1604a in the screen of FIG. 16, the remove controlling app determines to enlarge and display an image of a corresponding camera. As an embodiment, when a user gesture is sensed on a thumbnail image of a deactivated camera, the mobile terminal may not execute any operation or may display a message indicating that inquiring about an image is impossible.

As an optional embodiment, when a user gesture is sensed in a section where a camera does not exist (for example, the section 1604*b* of FIG. 16), the mobile terminal may transmit, to the home gateway, a message requesting an image of a corresponding section. Then, the home gateway instructs a home device equipped with a mobile camera module to move to a corresponding section and to record an image. The home gateway traces a position of the home device and transmits information associated with the position to the mobile terminal, and the mobile terminal moves a corresponding symbol 1604 along the movement of the home device and displays the same.

As an optional embodiment, when a touch and drag is sensed on the symbol 1604 corresponding to the home device equipped with a mobile camera module, the mobile terminal transfers a movement command associated with the touch and drag to the home gateway. The home gateway transfers the movement command to the home device, so that the home device moves according to the touch and drag.

As an optional embodiment, when a voice command, for example, "show me the living room" or "Let me see my living room", is input, in a state in which a voice function is activated, the mobile terminal may execute the remote controlling app, and may display, on a screen, an image of a section corresponding to the voice command in an enlarged size.

Figure 17:
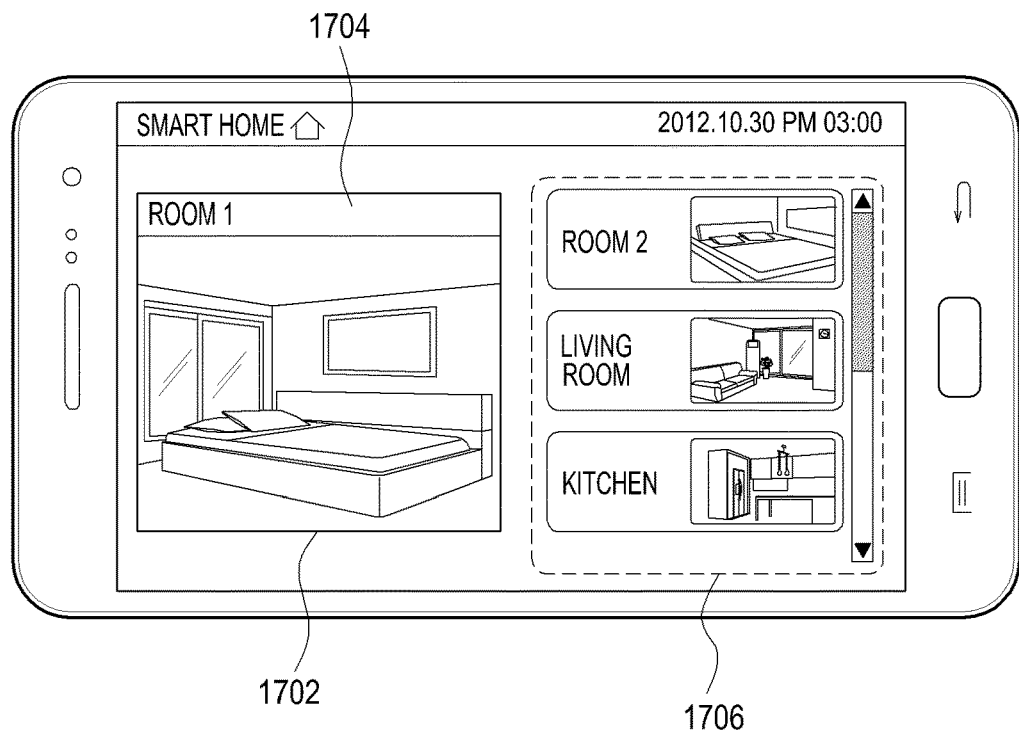
FIG. 17 illustrates a display of image data according to an embodiment of the present disclosure.

FIG. 17 illustrates a display of image data according to an embodiment of the present disclosure. As illustrated in the diagram, when a touch on a predetermined area or a voice command is input in a remote controlling app, a video 1702 that is being captured by a selected camera is displayed on a screen of a mobile terminal in an enlarged size, together with a title area 1704 including camera information associated with the video 1702. The camera information includes at least one of a position (for example, a room/living room/kitchen and the like), a type (for example, a mobile type/stationary type and the like), and a state (for example, an activated/deactivated state/state of being charged/movable state and the like) of a corresponding camera module.

Together with the selected video 1702, a list area 1706 indicating a list of other camera modules may be further displayed. The list area 1706 includes a title including camera information corresponding to each camera module, and additionally includes a thumbnail image of a corresponding image data.

Figure 18:
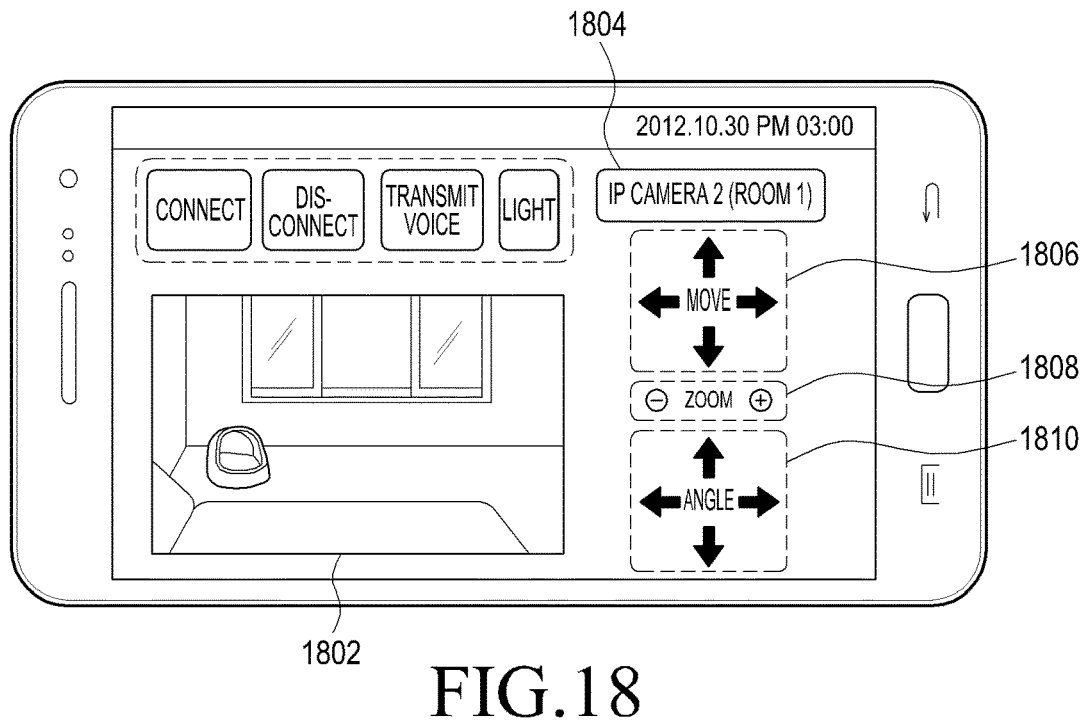
FIG. 18 illustrates a display of image data according to another embodiment of the present disclosure.

FIG. 18 illustrates a display of image data according to another embodiment of the present disclosure. As illustrated in the diagram, a video 1802 captured by a controllable camera is displayed in an enlarged size, together with a title area 1804 including camera information associated with the video 1802. The camera information includes at least one of a position (for example, a room/living room/kitchen and the like), a type (for example, a mobile type/stationary type and the like), and a state (for example, an activated/deactivated state/state of being charged/movable state and the like) of a corresponding camera module.

When a camera module corresponding to the video 1802 is a mobile camera, and an authority level of a mobile terminal that is capable of controlling a mobile camera is approved by a home gateway, a movement control area 1806 through which an input of a movement command for a camera module is received may be displayed together with the video 1802. The movement control area 1806 includes at least one of a forward/backward movement key and a left/right rotation key. In addition, together with the video 1802, at least one of a zoom control area 1808 and an angle control area 1810 for a corresponding camera module may be further displayed. The zoom control area 1808 includes zooming in/output keys of a camera module, and the angle control area 1810 includes upper/lower/left/right side keys for adjusting an angle of a camera module.

When the authority level of the mobile terminal that is capable of controlling a camera is not approved by the home gateway, at least one of the control areas 1806, 1808, and 1810 may be deactivated (for example, shading). As an embodiment, when the mobile terminal does not have authority for moving a mobile camera, the movement control area 1806 is displayed to be deactivated, and the mobile terminal may not respond to an input on the mobile control area 1806.

As an optional embodiment, when a user gesture is sensed in at least one of the control areas 1806, 1808, and 1810, the mobile terminal transmits a corresponding control command to the home gateway, and waits for an execution result (execution being completed or execution being impossible) associated with the control command from the home gateway. In this example, a corresponding control area or all control areas 1806, 1808, and 1810 may be deactivated during a predetermined waiting time after transmission of the control command. When the home gateway receives the execution result, the mobile terminal activates a corresponding control area so that a user may input a next control command.

Figure 19A:
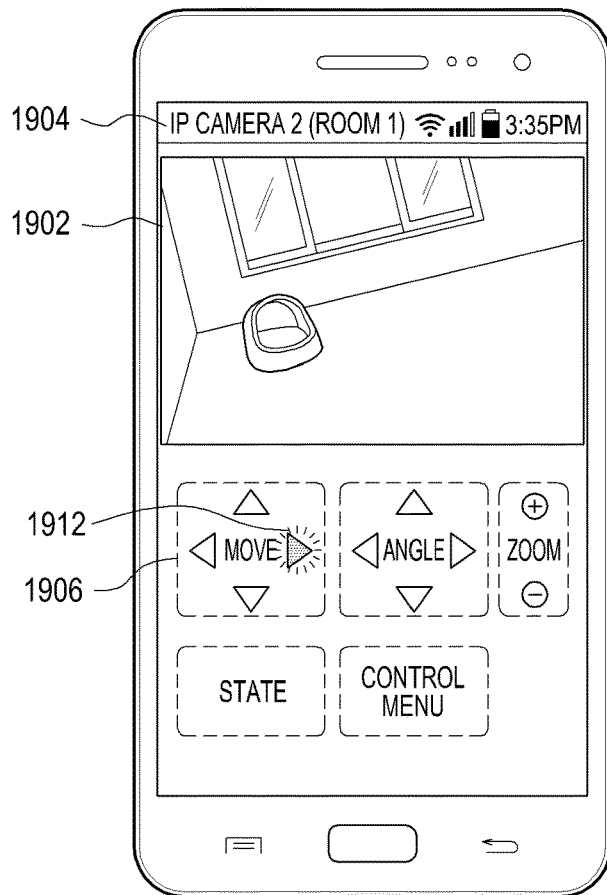
FIGS. 19A and 19B are screens illustrating a control of a mobile camera according to an embodiment of the present disclosure.
Figure 19B:
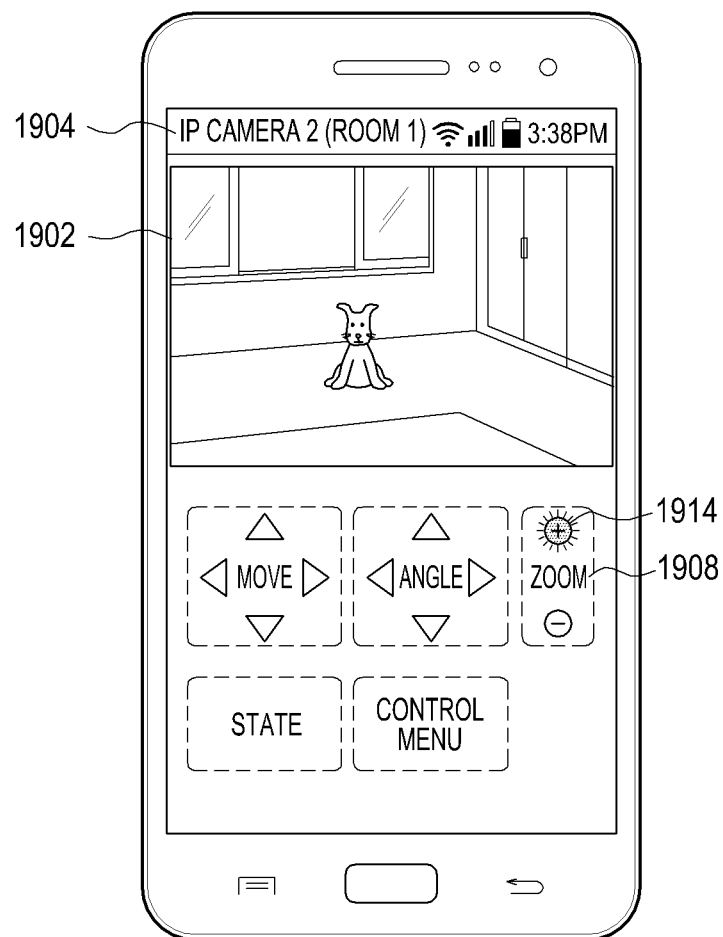

FIGS. 19A and 19B are screens illustrating a control of a mobile camera according to an embodiment of the present disclosure. As illustrated in the diagram, a video area 1902 displays a video through a mobile camera, a title area 1904 displays camera information associated with a mobile camera, and the movement control area 1806 includes at least one of a forward/backward key and a left/right rotation key.

As illustrated in FIG. 19A, when a user gesture 1912 is sensed on one of the keys included in the movement control area 1806, for example, a right rotation key, a control command corresponding to the user gesture 1912 is transferred to a mobile camera (or a mobile home device equipped with a camera module) from a mobile terminal through a home gateway.

Referring to FIG. 19B, a mobile camera (or a mobile home device equipped with a camera module) captures an image that is rotated to the right side in response to a control command corresponding to the user gesture 1912, and image data corresponding to the captured image is displayed on the video area 1902 of a mobile terminal through a home gateway.

Similarly, when a user gesture 1914 is sensed on one of the keys included in the zoom control area 1908, for example, a zoom-in key, image data that is zoomed in may be displayed in the video area 1902 of the mobile terminal.

Figure 20:
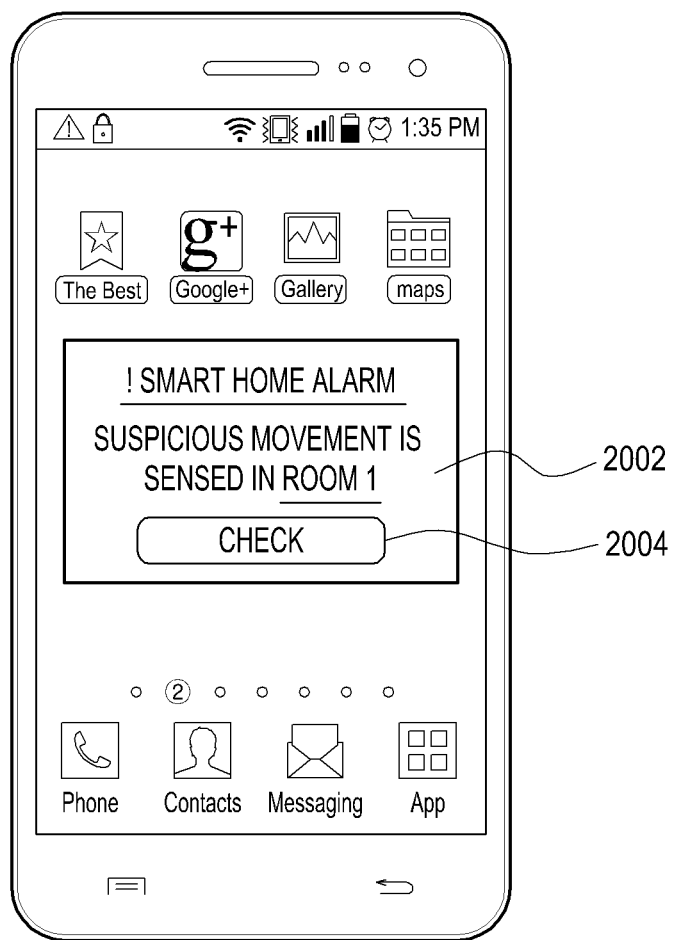
FIG. 20 illustrates an alarm for an abnormal circumstance associated with a home network system in a mobile terminal according to an embodiment of the present disclosure.

FIG. 20 illustrates an alarm for an abnormal circumstance associated with a home network system in a mobile terminal according to an embodiment of the present disclosure.

As illustrated in the diagram, the mobile terminal displays a warning message 2002 associated with an alarm message on a screen, when receiving the alarm message associated with an abnormal circumstance from the home gateway. The warning message 2002 may provide positional information associated with a section where an abnormal circumstance occurs, for example, "a suspicious movement is sensed in room 1". In addition, a shortcut key 2004 for executing a remote controlling app may be displayed, together with the warning message 2002.

When a user gesture is sensed on the shortcut icon 2004, the mobile terminal executes a remote controlling app, and the remote controlling app provides a screen configuration for home monitoring, for example, the screen of FIG. 15 or FIG. 16. In the screen configuration for home monitoring, a thumbnail image or a camera symbol associated with an abnormal circumstance may be displayed to be flashing or in a distinguishing color so as to indicate that an abnormal circumstance occurs. When the remote controlling app is executed by the shortcut icon 2004, the remote controlling app may automatically execute a designated function, for example, displaying image data associated with a section where an abnormal circumstance occurs, and the like.

Figure 21:
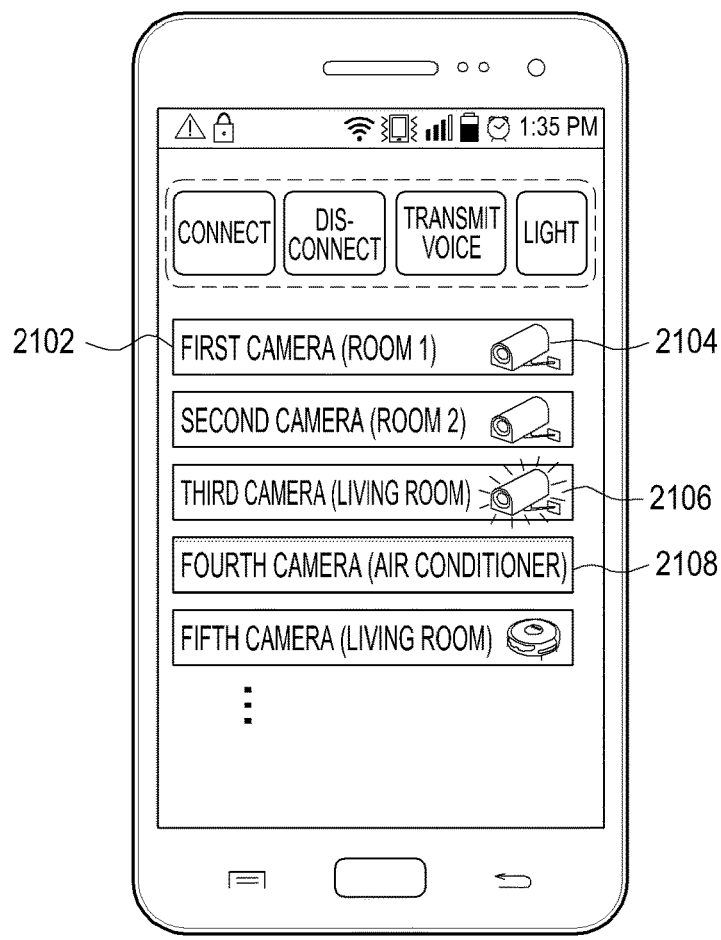
FIG. 21 illustrates a configuration of a screen for home monitoring of a remote controlling application according to another embodiment of the present disclosure.

FIG. 21 illustrates a configuration of a screen for home monitoring of a remote controlling app according to another embodiment of the present disclosure.

As illustrated in the diagram, the remote controlling app displays monitoring items 2102 of image data captured by camera modules installed in a home network system, in a form of a lattice or a list. Each monitoring item 2102 includes at least one of a name of a corresponding camera module, a position (for example, a room/living room/kitchen and the like), a type (for example, a mobile type/stationary type and the like), and a state (for example, an activated/deactivated state/state of being charged/movable state and the like) of the corresponding camera module, in a form of text or a form of a small image 2104.

As an optional embodiment, each monitoring item 2106 may be displayed together with a symbol (flashing or the like) indicating that an abnormal circumstance is sensed from a section (a rooms a kitchen, a living room and the like) where a corresponding camera module is installed. As another optional embodiment, a monitoring item 2108 of a camera that fails to obtain an approval for being inquired or that abnormally operates, may be displayed to be deactivated (for example, shading).

Figure 22:
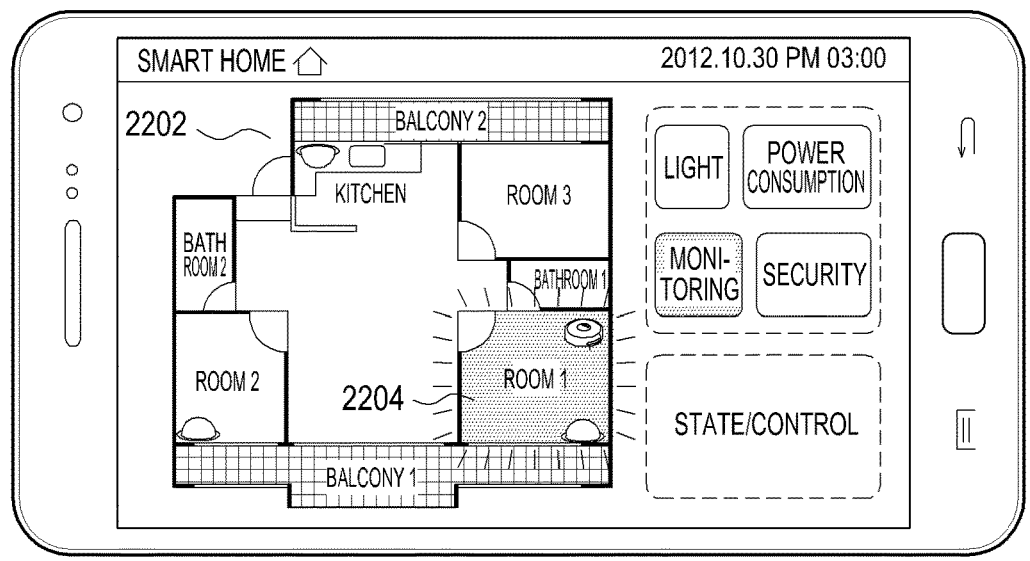
FIG. 22 illustrates a display of an abnormal circumstance associated with a home network system in a mobile terminal according to another embodiment of the present disclosure.

FIG. 22 illustrates a display of an abnormal circumstance associated with a home network system in a mobile terminal according to another embodiment of the present disclosure.

As illustrated in the diagram, a remote controlling app displays, in an arrangement plan 2202 of a house in which a home network system is installed, distinguished sections of an entire house, such as a room, a living room, a kitchen, a balcony and the like, and displays a section 2204 where an abnormal circumstance occurs to be distinguished so that a user identifies the same. As an example, when a sensing sensor of a window of room 1 senses damage in a window and reports the damage to a home gateway, the home gateway transmits, to a mobile terminal, an alarm message associated with the window of room 1. The remote controlling app of the mobile terminal displays a section 2204 corresponding to room 1 in the arrangement plan 2202 to be flashing or in a distinguishing color, and additionally displays a warning message such as "a suspicious movement is sensed in room 1", in response to the alarm message.

When a user gesture is sensed in the section 2204 corresponding to room 1, the remote controlling app receives, from the home gateway, image data associated with one of the cameras installed in room 1, and displays the image data on a screen as shown in FIG. 17 or FIG. 18.

The home network system configured as described in the above may strengthen monitoring of an area where is vulnerable to security in a house, using a mobile home device such as a robot cleaner or a mobile toy. The mobile home device may be configured to include a camera module, and to execute a sensing function such as a movement sensing and/or sound sensing.

In a security mode, a mobile home device and stationary sensing modules in a house begin execution of monitoring. When a movement or a sound is sensed through the mobile home device or the stationary sensing module, the home gateway begins collecting image data through cameras (mobile and stationary types) included in a house, and may analyze image data collected by the cameras and sensed data sensed by sensing modules. As an example, the home gateway may determine whether a person exists in a house based on image data, and may determine whether an abnormal circumstance occurs based on whether states of sensing modules and home devices are changed, and the like. When a result of the analysis determines that an abnormal circumstance occurs, the home gateway operates based on a predetermined procedure. That is, the home gateway transmits a text/image to a mobile terminal of a registered user, and reports abnormality to the police or the security company.

When a security mode is executed, the home gateway instructs a mobile home device to move to at least one target position set in advance so as to execute image monitoring and sensing. To this end, the home gateway receives, in advance, an input of information associated with a place where a sensing module is not installed or a position having a high probability of intrusion, and executes patrol monitoring with respect to positions set by a user when the security mode is executed. When sensing an abnormal circumstance, the mobile home device begins recording image data at a corresponding position. When an abnormal circumstance is sensed by another sensing module, the mobile home device begins recording image data and moves to a place where the abnormal circumstance occurs.

The mobile home device receives, from the home gateway, information associated with target positions such as a place where a child or a pet is located, moves to a corresponding target position, executes monitoring, and reports image data (a video or a still image) to the home gateway. The home gateway may transfer the reported image data to a registered mobile terminal of a user.

The home gateway stores positional information of target objects to be monitored, for example, electrical appliances, in a form of a vector based on an entrance or a center of a corresponding section. The mobile home device may store map data associated with sections in a house or may receive the same from the home gateway, and may move to the target objects based on the vector.

The home gateway may extract a movement vector for a movement to a desired target object using a distance from an entrance of each section to a wall and an image of a mobile home device. As another embodiment, a mobile home device directly calculates a movement vector and reports the movement vector to the home gateway.

Figure 23:
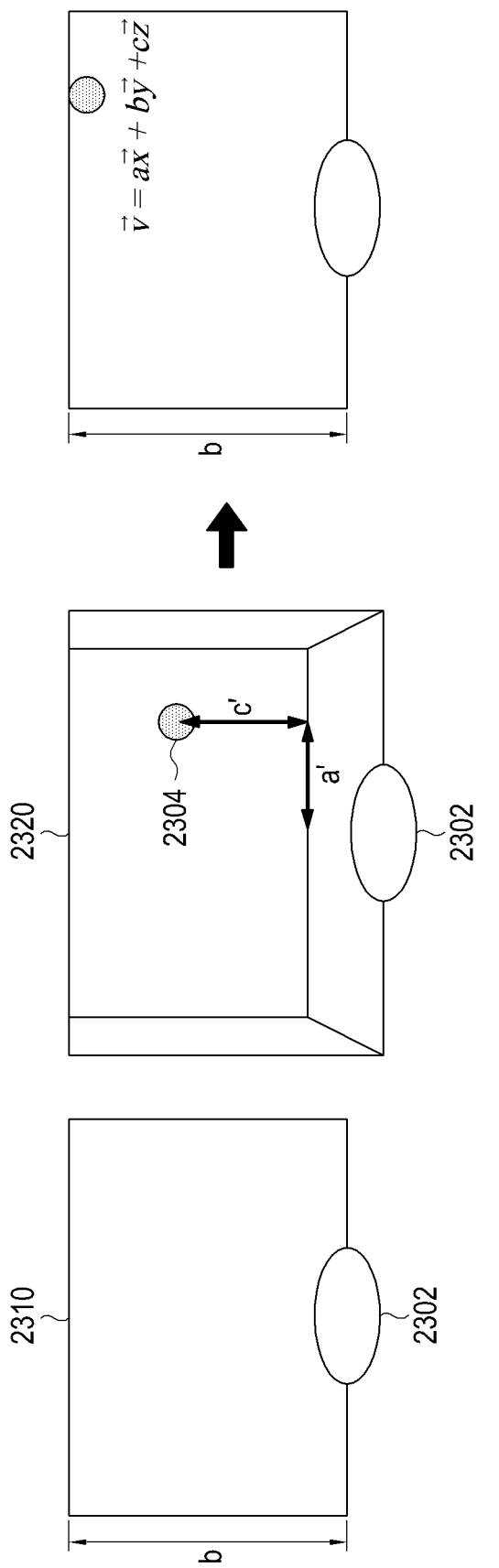
FIG. 23 illustrates calculation of a movement vector of a mobile home device according to an embodiment of the present disclosure.

FIG. 23 illustrates calculation of a movement vector of a mobile home device according to an embodiment of the present disclosure.

Referring to FIG. 23, the reference numeral 2310 illustrates a ground plan of one section in a house, for example, a room, and the reference numeral 2320 illustrates an image captured at an entrance 2302 of the section 2310 by a camera of a mobile home device. A target object 2304 to be monitored, for example, a gas valve, may be located on a wall facing the entrance 2302, and an actual distance from the entrance 2302 to the wall is b.

As illustrated in the reference numeral 2320, in an image captured by the mobile home device, a horizontal distance from the entrance 2302 to the target object 2304 is measured to be a' and a height from a floor to the target object 2304 is measured to be c'. The measured values indicate lengths in the captured image and thus, may be converted into an actual distance using a screen magnification per unit distance m. The screen magnification per unit distance m is a value determined based on a camera magnification of a mobile home device.

The mobile home device or a home gateway may calculate, based on b, a', and c', a movement vector from the entrance 2302 to the target object 2304 as shown in Equation 1.

$$\vec{v}=a\vec{x}+b\vec{y}+c\vec{z} \quad a=a'\div(m/b) \quad c=c'\div(m/b) \qquad \text{Equation 1}$$

As another embodiment, the movement vector may be calculated as shown in Equation 2.

$$\vec{v}=a\vec{x}+b\vec{y}+c\vec{z} \quad a=a'\div f(m,b) \quad c=c'\div f(m,b) \qquad \text{Equation 2}$$

Here, f( ) is a function for calculating a ratio of a distance on a screen to an actual distance, and may be determined based on a type of a camera.

A movement vector calculated as described above indicates 3D positional information associated with the target object 2304 in the section 2310.

When a mobile home device operates in a security mode, or receives an instruction from a user or the home gateway, the mobile home device moves to the target object 2304 based on the movement vector, and captures the target object 2304 by adjusting an angle and a zoom magnification of a camera module. The captured image is transmitted to the home gateway and/or the mobile terminal, so that the user observes the target object 2304 in detail.

When a user desires to check circumstances in a house, the present disclosure operated as described above provides image data through a mobile terminal so as to promote user's convenience, and controls a mobile camera for a place that is not monitored by a stationary camera so that the user readily views an image of a desired place. Also, when an abnormal movement occurs in the house, a user outside the house may readily recognize the abnormality through the mobile terminal, and checks circumstances in the house through image data and thus, dangerous circumstances that may occur in the house may be prevented.

Although specific exemplary embodiments have been described in the detailed description of the present disclosure, various modifications may be made without departing from the scope of the present disclosure. Therefore, the scope of the present disclosure should not be defined as being limited to the embodiments, but should be defined by the appended claims and equivalents thereof.

What is claimed is:

1. A robot cleaner comprising:
   drive elements configured to allow the robot cleaner to move in an area;
   cleaning elements;
   at least one camera;
   a communication interface; and
   at least one processor configured to:
      obtain a request from a mobile terminal through the communication interface,
      determine whether the request received from the mobile terminal is associated with a security operation or a cleaning operation,
      in a case that the request is determined as being associated with the security operation:
         control the drive elements for the robot cleaner to move along a predetermined path including a docking position and a target position,
         control the drive elements for the robot cleaner to rotate to a predetermined direction at the target position to obtain at least one image for the predetermined direction using the at least one camera,
         detect movement of an object based on the at least one image obtained using the at least one camera, and
         in response to detecting the movement of the object:
            obtain two or more images using the at least one camera, and
            transmit the two or more images to the mobile terminal via the communication interface, and
      in a case that the request is determined as being associated with the cleaning operation:
         control the cleaning elements for the robot cleaner to perform cleaning.

2. The robot cleaner of claim 1, further comprising:
   a memory configured to store information related to a security mode,
   wherein if the request is associated with the security operation, the at least one processor is further configured to:
      control the drive elements for the robot cleaner to move along the predetermined path including the docking position and the target position based on the information related to the security mode, and
      control the drive elements for the robot cleaner to rotate to the predetermined direction at the target position to obtain the at least one image for the predetermined direction using the at least one camera based on the information related to the security mode.

3. The robot cleaner of claim 2,
   wherein the at least one processor is further configured to:
      obtain first information related to the predetermined path and second information related to the predetermined direction, and
      store the first information and the second information in the memory, and
   wherein the information related to the security mode comprises the first information and the second information.

4. The robot cleaner of claim 3, wherein to obtain the first information and the second information, the at least one processor is further configured to obtain at least one of the first information and the second information from the mobile terminal via the communication interface.

5. The robot cleaner of claim 1, wherein to obtain the at least one image, the at least one processor is further configured to control the at least one camera to obtain a plurality images while the robot cleaner is at the target position.

6. The robot cleaner of claim 1, further comprising:
   an illumination device,
   wherein the at least one processor is further configured to use the illumination device to obtain the two or more images.

7. A method for operating a robot cleaner comprising:
   obtaining a request from a mobile terminal;
   determining whether the request received from the mobile terminal is associated with a security operation or a cleaning operation;
   in case that the request is determined as being associated with the security operation:
      moving along a predetermined path including a docking position and a target position,
      rotating to a predetermined direction at the target position to obtain at least one image for the predetermined direction,
      detecting movement of an object based on the obtained at least one image, and
      in response to detecting the movement of the object, obtaining two or more images, and transmitting the two or more images to the mobile terminal; and in case that the request is determined as being associated with the cleaning operation:

performing cleaning using cleaning elements of the robot cleaner.

8. The method of claim 7, wherein moving along the predetermined path including the docking position and the target position comprises moving along the predetermined path including the docking position and the target position based on information related to a security mode, and wherein rotating to the predetermined direction at the target position to obtain the at least one image for the predetermined direction comprises rotating to the predetermined direction at the target position to obtain the at least one image for the predetermined direction based on the information related to the security mode.

9. The method of claim 8, further comprising:

obtaining first information related to the predetermined path and second information related to the predetermined direction; and storing the first information and the second information in a memory of the robot cleaner, and wherein the information related to the security mode comprises the first information and the second information.

10. The method of claim 9, wherein at least one of the first information and the second information are obtained from the mobile terminal.

11. The method of claim 7, further comprising, to obtain the at least one image, obtaining a plurality images while the robot cleaner is at the target position.

12. The method of claim 7, wherein the two or more images are obtained using an illumination device of the robot cleaner.

* * * * *

UNITED STATES PATENT AND TRADEMARK OFFICE
CERTIFICATE OF CORRECTION

PATENT NO. : 11,064,158 B2
APPLICATION NO. : 16/748270
DATED : July 13, 2021
INVENTOR(S) : Kyung-Jae Kim et al.

Page 1 of 1

It is certified that error appears in the above-identified patent and that said Letters Patent is hereby corrected as shown below:

In the Claims

Claim 1, at Column 29, Lines 55-57, please replace "determine whether the request received from the mobile terminal is associated with a security operation or a cleaning operation" with --determine whether the request obtained from the mobile terminal is associated with a security operation or a cleaning operation--.

Claim 7, at Column 30, Lines 54-56, please replace "determining whether the request received from the mobile terminal is associated with a security operation or a cleaning operation" with --determining whether the request obtained from the mobile terminal is associated with a security operation or a cleaning operation--.

Signed and Sealed this
Tenth Day of August, 2021

Drew Hirshfeld
*Performing the Functions and Duties of the
Under Secretary of Commerce for Intellectual Property and
Director of the United States Patent and Trademark Office*